(12) United States Patent
Miyaji et al.

(10) Patent No.: US 7,441,803 B2
(45) Date of Patent: Oct. 28, 2008

(54) GAS GENERATOR FOR AIR BAG, DEFLECTING MEMBER, COOLANT/FILTER MEANS SUPPORTING MEMBER, COOLANT AND HOUSING

(75) Inventors: Katsuhito Miyaji, Hyogo (JP); Yasunori Iwai, Osaka (JP); Masayuki Yamazaki, Hyogo (JP); Yoshihiro Nakashima, Hyogo (JP); Atsushi Hatomoto, Hyogo (JP)

(73) Assignee: Daicel Chemical Industries, Ltd., Osaka (JP)

( * ) Notice: Subject to any disclaimer, the term of this patent is extended or adjusted under 35 U.S.C. 154(b) by 0 days.

(21) Appl. No.: 11/342,825

(22) Filed: Jan. 31, 2006

(65) Prior Publication Data

US 2006/0151978 A1      Jul. 13, 2006

Related U.S. Application Data

(62) Division of application No. 11/085,653, filed on Mar. 22, 2005, now abandoned, which is a division of application No. 10/203,461, filed as application No. PCT/JP01/01258 on Feb. 21, 2001, now Pat. No. 6,926,304.

(30) Foreign Application Priority Data

| Feb. 22, 2000 | (JP) | 2000-44766 |
| Feb. 22, 2000 | (JP) | 2000-44767 |
| Feb. 28, 2000 | (JP) | 2000-51993 |
| Feb. 28, 2000 | (JP) | 2000-188655 |
| Feb. 14, 2001 | (JP) | 2001-36937 |

(51) Int. Cl.
    *B60R 21/16*   (2006.01)
(52) U.S. Cl. .................................... 280/740

(58) Field of Classification Search .................. 280/741, 280/742, 740, 739, 736
See application file for complete search history.

(56) References Cited

U.S. PATENT DOCUMENTS

| 5,466,420 | A | 11/1995 | Parker et al. | |
| 5,782,487 | A | 7/1998 | Bauer et al. | |
| 6,032,979 | A * | 3/2000 | Mossi et al. | 280/741 |
| 6,315,322 | B1 * | 11/2001 | Mika | 280/736 |
| 6,364,353 | B2 * | 4/2002 | Green et al. | 280/736 |
| 6,378,901 | B1 | 4/2002 | Yamazaki et al. | |
| 6,695,345 | B2 * | 2/2004 | Katsuda et al. | 280/736 |

FOREIGN PATENT DOCUMENTS

| JP | 3-174210 A | 7/1991 |
| JP | 4-2542 A | 1/1992 |

(Continued)

*Primary Examiner*—Faye M. Fleming
(74) *Attorney, Agent, or Firm*—Birch, Stewart, Kolasch & Birch, LLP

(57) ABSTRACT

Gas generator for air bag having any of the following members: deflecting member formed as tube portion capable of shielding gas discharge port formed on circumferential wall of housing from inside; coolant/filter means supporting member comprising annular portion arranged to face end surface of housing and wall portion contacting with inner periphery of coolant/filter means; coolant/filter means formed in cylindrical shape obtained by laminating wire mesh; housing securely fixing igniter included in ignition means, having opening portion for inserting and fixing igniter or igniter supporting member, wherein the opening portion is provided with connecting portion for fixing inserted igniter or igniter supporting member, and connecting portion is provided in inner side of housing rather than end surface having the opening portion.

12 Claims, 8 Drawing Sheets

FOREIGN PATENT DOCUMENTS

| | | | |
|---|---|---|---|
| JP | 4-87859 A | 3/1992 |
| JP | 5-16761 A | 1/1993 |
| JP | 5-213147 A | 8/1993 |
| JP | 6-255441 A | 9/1994 |
| JP | 06255441 A * | 9/1994 |
| JP | 7-215163 A | 8/1995 |
| JP | 07-285412 | 10/1995 |
| JP | 7-285413 A | 10/1995 |
| JP | 3019917 U | 10/1995 |
| JP | 9-76869 A | 3/1997 |
| JP | 9-207705 A | 8/1997 |
| JP | 10-119705 A | 5/1998 |
| JP | 2938755 B | 6/1999 |
| JP | 11-197422 A | 7/1999 |
| JP | 11-244629 A | 9/1999 |
| JP | 2000-16226 A | 1/2000 |

* cited by examiner

GAS GENERATOR FOR AIR BAG, DEFLECTING MEMBER, COOLANT/FILTER MEANS SUPPORTING MEMBER, COOLANT AND HOUSING

This application is a Divisional of application Ser. No. 11/085,653 filed on Mar. 22, 2005 now abandoned, which is a Divisional of application Ser. No. 10/203,461 filed on Aug. 8, 2002 now U.S. Pat. No. 6,926,304 and for which priority is claimed under 35 U.S.C. § 120. application Ser. No. 10/203, 461 is the national phase of PCT International Application No. PCT/JP01/01258 filed on Feb. 21, 2001 under 35 U.S.C. § 371. This application also claims priority under 35 U.S.C. § 119 of Application Nos. 2000-044766; 2000-044767; 2000-051993; 2000-051994; 2000-188655; and 2001-036937, all filed in Japan on Feb. 22, 2000; Feb. 22, 2000; Feb. 28, 2000; Feb. 28, 2000; Jun. 23, 2000; and Feb. 14, 2001. The entire contents of each of the above-identified applications are hereby incorporated by reference.

TECHNICAL FIELD

The present invention relates to a gas generator for an air bag protecting a passenger from the impact. Further, the present invention relates to a constituting member used for the purpose of removing a combustion product generated due to a combustion, particularly of gas generating means, specifically, (1) a deflecting member, (2) a coolant/filter means supporting member and (3) a housing preventing a short pass. Further, the present invention relates to (4) a coolant made of a wire mesh. Further, the present invention relates a (5) a housing in which an igniter inlet also has a bent portion.

In addition, the present invention relates to a gas generator for an air bag using the above and an air bag apparatus.

PRIOR ART

In various kinds of vehicles mainly including a automobile, an air bag system is mounted for the purpose of supporting an passenger with an air bag (bag body) quickly inflated with a gas, at a time when the vehicle is collided at a high speed, so as to prevent the passenger from crashing into a hard portion inside the vehicle such as a steering wheel, a windshield due to an inertia, and getting injured. In general, the air bag apparatus comprises a sensor, a control unit, a pad module and the like, and the pad module comprises a module case, an air bag, a gas generator and the like, and is mounted to, for example, a steering wheel.

Among them, the gas generator is formed so that, when an ignition means is activated due to the impact, a gas generating means is burnt to generate a high-temperature and high-pressure gas, and the generated gas is ejected into the air bag (bag body) through a gas discharge port to inflate the air bag, thereby forming a cushion for absorbing the impact between a steering wheel and the passenger. It is known that an operating gas, which is generated by the combustion of the gas generating means for inflating the air bag, generally has a high-temperature, and a combustion by-product is included in the operating gas in some kinds of gas generating means.

Accordingly, in the currently provided gas generator, filter means or coolant/filter means for purifying the combustion product contained in the operating gas before being discharged from the housing is disposed in the housing.

However, since the conventionally provided filter means or the coolant/filter means is generally made of a wire mesh, a solid combustion product can be removed from the operating gas, but a combustion product generated in a state of fluidized body or a semi-fluidized body cannot be removed. In addition, in the case that the gas generating means generates an alkali mist due to the combustion, there is a possibility such that the alkali mist newly generates high-temperature heat particles due to erosions including a chemical reaction with a filter means, a coolant means or the like which is made of a stainless steel and widely used, and that these high-temperature heat particles are discharged out of the housing.

Further, in the conventionally provided gas generator, a cylindrically formed filter means or coolant/filter means is disposed in the housing for the purpose of purifying the combustion product contained in the operating gas and cooling the operating gas before being discharged from the housing.

Further, since the cylindrical filter means or the like is for purifying and/or cooling the operating gas generated due to the combustion of a gas generating agent before discharging from the gas discharge port, the gas generating means is stored in a hollow portion of the cylindrical filter means or the like. Accordingly, the filter means or the coolant/filter means has a function of defining a space for accommodating the gas generating means.

Therefore, conventionally in any gas generator in which the gas generating means to generate the operating gas due to the combustion of the gas generating means, the filter means or the coolant/filter means having the function mentioned above is used in general. It is desirable that the coolant/filter means does not move in view of forming the accommodating space for the gas generating means, and that the coolant/filter means does not move when the operating gas passes. Accordingly, in general, the coolant/filter is disposed by being fixed with various kinds of methods such as interposing this by upper and lower inner surfaces in the housing or the like.

However, in view of a performance of the coolant/filter means in manufacturing and activating the gas generator, it is yet insufficient to simply fix inside the housing, and it is desirable to solve various kinds of problems caused by actions of the coolant/filter means.

In other words, in view of safety in activating the air bag system, desirably, all of the operating gas passes through the coolant/filter means, and also in view of the fact that the coolant/filter means is used for forming a space for accommodating the gas generating means at a time of manufacturing the gas generator, desirably, a disposing position thereof is always fixed. Further, at a time of activating the gas generator, there is a possibility such that the housing may have a high-temperature by some kinds of gas generating agent or the like and that the air bag being in contact therewith may be damaged. Therefore, desirably, the heat generated in the above gas generator is not transferred to at least the housing in the gas discharge port side. Further, at a time of fixing the coolant/filter means to the inside of the housing, it is desirable to securely perform fixing.

However, as mentioned above, the above effects cannot be expected only by simply fixing the coolant/filter means to the inside of the housing.

On the contrary, the operating gas passing through the coolant means is thereafter will be discharged from the gas discharge port formed in the housing, however, in view of an effective use of the coolant means, it is desirable to prevent the operating gas from passing through the coolant means disposed around the gas discharge port.

Further, an outer shell container of the gas generator is conventionally formed by casting, forging or press-molding various kinds of metals, however, it is desirable to facilitate manufacturing with a sufficient strength secured.

Yet, conventional gas generators have to be improved a lot in a manufacturing cost, a manufacturing process, a safety in operation and the like, with respect to a combination of the coolant means and the housing.

That is, since the coolant means receives the pressure due to the passage of the operating gas, fixing thereof needs to be performed securely, and at manufacturing the gas generator, in view of the fact that the coolant means is also used for defining the space for accommodating the gas generating means, desirably the disposing position thereof is constantly fixed. In addition, in view of safety in activating the air bag system, it is desirable that the entire operating gas passes through the coolant means.

Further, in view of a manufacturing process and a manufacturing cost, a further simple structure with the above functions is desirable.

In conventional gas generators for the air bag, as the coolant and/or the filter mentioned above, there is used a coolant mainly for purifying the operating gas and a filter mainly for cooling the operating gas are used together, or a coolant/filter having a gap structure obtained by compressing a laminated wire mesh body for simultaneously cooling and purifying the operating gas. However, in the case of using the coolant and the filter together, a accommodating space therefore is required, and two members are formed, so that the container has to be totally larger, and the manufacturing process and the manufacturing cost are increased. Further, in the case of using the coolant/filter, this has both of a cooling function and a purifying function of the operating gas, so that the accommodating space can be reduced, however, a manufacturing process for forming the coolant/filter becomes complicated.

Accordingly, in the gas generator for the air bag, with respect to the coolant and the filter disposed in the housing for the purpose of cooling and purifying the operating gas, a development has been performed in view of the functions, but a development in view of facilitating the manufacture and the manufacturing cost are not yet sufficiently achieved.

In the gas generator formed in this manner, the ignition means including the igniter is disposed in the housing as a requisite member for starting an activation of the gas generator, and the igniter is electrically connected to a control unit arranged out of the housing. The control unit has a function of receiving a signal from a sensor detecting the impact so as to judge a degree of the impact and then, outputting the activating signal. Accordingly, at a time of disposing the igniter, in order to receive the activating signal from the control unit, a portion electrically connected to the control unit is exposed from the housing.

Therefore, in the conventionally provided gas generator for the air bag, an opening portion for receiving and fixing the igniter is formed in the housing, and an edge of the opening portion is formed so as to protrude in a cylindrical shape towards the outside of the housing.

However, since the gas generator for the air bag structured in the above manner is stored in a module case together with the air bag (bag body) or the like, and the module case is mounted in a steering at a driver side and in a dashboard before a front passenger (but not a driver) side, it is desirable to make the module case smaller. In particular, in the case of arranging in the driver side, since a height of the gas generator reflects directly on a thickness of the steering wheel, it an assignment to restrict an total axial length of the housing to be small.

DISCLOSURE OF THE INVENTION

The present invention relates to a constituting member used for the purpose of removing a combustion product, in particular, (1) a deflecting member, (2) a coolant/filter means supporting member, (3) a housing having a structure preventing a short pass, and (4) a coolant made of a laminated wire mesh. Further, the present invention relates a (5) a housing in which an igniter inlet also has a bent portion. Further, the present invention relates to a gas generator for an air bag using the above and an air bag apparatus.

The present invention relates to a gas generator using at least one of these constituting members, and an air bag apparatus, and some constituting members may be combined.

Further, the present invention relates to a method of restricting and controlling a gas flow-path by the aspects (1), (2), (3) or the like so as to prevent a combustion residue or the like from flowing out and avoid an influence of an abnormal combustion gas such as a flame or the like, thereby obtaining a desirable gas outflow.

A description will be given of respective members below.

(1) Deflecting Member

The present invention provides a constituting member which solves the problems of the conventional art mentioned above and makes a combustion product be contained in an operating gas discharged from a gas discharge port as little as possible while being formed in a simple structure, and a gas generator for an air bag effectively using the same.

A deflecting member according to the present invention is used for removing a combustion product contained in an operating gas after passing through a coolant/filter means, which is the product produced from a gas generating means provided in a housing.

In other words, the deflecting member of the present invention is a constituting member used for a gas generator for an air bag comprising, in a housing with a gas discharge port, a gas generating means to generate an operating gas for inflating an air bag and a cylindrical coolant/filter means to cool and/or purify the operating gas in the housing, and the deflecting member is provided with a tube portion in such a shape to be arranged to face the inner periphery of the housing of the cylindrical gas generator, and the tube member has a shape and/or a structure to be able to, at least, shield the gas discharge port, which is formed in the circumferential wall of the gas-generator housing, from the inside of the housing.

It is desirable that the above deflecting member, in case of being disposed in the housing, is formed in a shape and/or a structure such that a combustion product generated due to a combustion of the gas generating means is prevented from being discharged out of the housing from the gas discharge port and also a flame of the ignition means for igniting the gas generating means is prevented from being discharged out of the housing from the gas discharge port.

For example, the deflecting member can adhere a fluidized or semi-fluidized combustion product contained in the operating gas to remove by allowing the operating gas, which has passed through the coolant/filter means toward the gas discharge port, to strike against the tube portion which is disposed in the gas-generator housing and has a shape capable of being arranged to face the inner periphery of the gas-generator housing.

Accordingly, it is necessary that the tube portion included in the deflecting member is formed in a shape and/or a structure capable of shielding a gas discharge port formed on a circumferential wall of the gas-generator housing from the inside of the housing, or in a shape and/or a structure to cover the part of the coolant/filter projected horizontally from a gas discharge port, in the case of arranging the deflecting member within the housing. By forming the tube portion in such a shape (including a length)/a structure, in a state of being used in the gas generator, the operating gas which has passed through the coolant/filter means strikes against the tube portion before reaching the gas discharge port, and a flow thereof is deflected. When the operating gas which has passed through the coolant/filter means strikes against the tube portion of the deflecting member, the combustion product contained the gas adheres to the tube portion, or is accumulated in the housing by striking against the deflecting member, thereby being kept inside the housing. Accordingly, it is possible to prevent a solid material from being discharged through the gas discharge port and to securely avoid a damage to the air bag.

An example of such a deflecting member can comprise the tube portion formed in the above manner and an inwardly flange-shaped annular portion, integrally formed with the tube portion. In this case, it is desirable that the annular portion is formed so as to contact with either end surface of the coolant/filter means provided in the housing.

And desirably, the above deflecting member in a state of being disposed in the housing has the tube portion formed so that a gap for a flow-pass of the operating gas is secured between the coolant/filter means and the inner periphery of the housing. In other words, it is desirable that an inner diameter of the tube portion is partly formed larger than an outer diameter of the coolant/filter means of the gas generator in which the deflecting member is used but smaller than an inner diameter of the housing periphery. For example, this can be realized by forming the inner diameter of an upper portion of the tube portion to be equal to the outer diameter of the coolant/filter means as well as by forming the inner diameters of a middle portion and a lower portion thereof to be larger than the inner diameter of the upper portion but smaller than the inner diameter of the housing periphery.

As mentioned above, the deflecting member is for removing the combustion product contained in the operating gas by allowing the gas to strike against the tube portion. Therefore, desirably, the deflecting member is formed not to be bent due to a pressure of the operating gas nor to close the gas discharge port. This can be materialized, for example, by forming a supporting portion with an end thereof bent outwardly and radially on the lower end of the tube portion. In this case, the supporting portion contacts with the inner periphery of the housing to support the tube portion, whereby making it possible to stop the tube portion from expanding due to the pressure of the operating gas. When a flange-shaped supporting portion is formed in a lower end of the tube portion, it is desirable to form a ventilating portion in the supporting portion which is capable of letting the operating gas pass through. Such a ventilating portion can be realized by forming a plurality of through-holes in the supporting portion or notching a peripheral edge thereof partly or entirely in a serration shape or a gear shape.

The above deflecting member can be also used as a mist collecting member for collecting a combustion by-product generated by the combustion of the gas generating means, that is, a semi-fluidized or solid mist, and further can be used as a flame-preventing plate capable of preventing a flame, which is generated by the combustion of the ignition means or the gas generating means, from being discharged out of the housing through the gas discharge port.

In the case that the inwardly flange-shaped annular portion, which contacts with either of end surfaces of the coolant/filter means, is provided in the tube portion of the deflecting member, it is possible to position the deflecting member at a time of arrangement by controlling an inner diameter of a central opening of the annular portion and bringing the inner-edge surface into contact with the end surface of the inner cylindrical member disposed in the gas-generator housing. For example, when a welding margin in a flange shape is formed on the inner cylindrical member and the welding margin is welded to an inner surface of a diffuser shell, it is desirable that the inner diameter of the central opening of the annular portion is formed to correspond to the outer diameter of the welding margin. Further, by forming the tube portion to join an outer peripheral edge of the inwardly flange-shaped annular portion, a position of the coolant/filter means can be determined by a curved portion between the tube portion and the annular portion, and can be prevented a so-called short pass such that the operating gas passes between the end surface of the coolant/filter means and the inner periphery of the housing at actuation of the gas generator. This can be also realized, for example, by supporting the outer peripheral edge of the cylindrical coolant/filter means which is disposed in the housing with the curved portion as well as by clinging thereto and contacting therewith.

In the case of forming this annular portion to have a proper elasticity at least in the thickness direction thereof, the coolant/filter means can be held securely due to an elasticity of the annular portion. For example, the annular portion can be made of an elastic member such as a resin, or can be bent so as to be formed in a shape or a structure capable of achieving a proper elasticity. Further, by forming the annular portion so as to achieve a proper heat insulating effect, the heat of the coolant/filter means, which is increased by cooling the operating gas, can be inhibited from transferring to the diffuser shell, and therefore a damage to the air bag can be avoided. For example, the annular portion can be formed to secure a space for insulating heat by forming, at least, a portion thereof in the coolant/filter side with a heat-insulating member such as a resin, or by bending the portion.

In addition, it is desirable to form, in the annular portion, a wall portion having a shape to contact with the inner periphery of the coolant/filter means to decide a position of the coolant/filter means with the wall portion or to prevent a so-called short pass such that the operating gas passes between the end surface of the coolant/filter means and the inner periphery of the housing. In this case, a width between the wall portion and the tube portion is desirably formed to be equal to a thickness of the coolant/filter means provided in the gas-generator housing. When the width between the wall portion and the tube portion is adjusted in the above manner, the coolant/filter means can be held between both of the portions, whereby making it possible to securely position and fix the coolant/filter means by the deflecting member and to securely prevent the short pass.

As described above, the deflecting member comprising the tube portion, the inwardly flange-shaped annular portion, and/or the wall portion formed on the annular portion can be a single member. In this case, the deflecting member can be formed, for example, by press-molding a stainless steel or the like. If the deflecting member is formed as the single member, by forming and providing only one member at time of manufacturing a gas generator for an air bag, such functions as to prevent the short pass of the operating gas, to purify the operating gas and/or to position and support the coolant/filter means can be provided at the same time, whereby making it possible to widely reduce the manufacturing cost.

Further, the present invention also provides a gas generator for an air bag including the above deflecting member. In this gas generator, the combustion product contained in the operating gas can be removed unfailingly.

That is, there is provided a gas generator for an air bag comprising, in a cylindrical housing with a gas discharge port, an ignition means to activate a gas generator, a gas generating means to generate an operating gas for inflating an air bag on activation of the ignition means, and a cylindrical coolant/filter means for purifying and/or cooling the operating gas, in which a space portion as a flow path of the operating gas is secured between an outer periphery of the cylindrical coolant/filter means and an inner periphery of a circumferential wall portion of the housing, and a deflecting member, which has a shape and/or a structure to deflect a flow of the operating gas passing through the coolant/filter means towards the gas discharge port is arranged in the space portion.

Further, the present invention also provides a gas generator in which a mist collecting member, for collecting a combustion by-product generated by the combustion of the gas generating means, that is, fluidized, semi-fluidized or solid mists, is arranged between the outer periphery of the cylindrical coolant/filter means and the inner periphery of a circumferential wall portion of the housing, and further provides a gas generator in which a flame-preventing plate, for preventing a flame generated by the combustion of the ignition means or the gas generating means from being discharged out of the housing through the gas discharge port, is arranged.

It is desirable that above the deflecting member is arranged to contact with either end surface of the cylindrical coolant/filter means, and further, it is desirable that a space portion as a flow-path of the operating gas is secured between the outer periphery of the cylindrical coolant/filter means and the inner periphery of the circumferential wall portion of the housing in order to arrange a part of the deflecting member, and that a portion existing in the space portion is formed and arranged to deflect a flow of the operating gas passing through the coolant/filter means towards the gas discharge port. Preferably, a portion existing in the space of the deflecting member is formed to include a portion which is in contact neither with the coolant/filter means nor with the inner periphery of the housing. With this structure, gaps are secured between the deflecting member and the coolant/filter means, and between the deflecting member and the inner periphery of the housing, whereby forming a flow-pass of the operating gas with the gaps.

In the case of arranging, in the center in the housing, the inner cylindrical member with a flange portion connected to the end surface of the housing, desirably, an outer diameter of the flange portion in the inner cylindrical member coincides with an inner diameter of a central opening formed in the annular portion constituting the deflecting member. This is because a position of the deflecting member is determined by a combination of both elements.

In the gas generator for the air bag in which the deflecting member includes the tube portion having the shape capable of being arranged to face the inner periphery of the cylindrical housing and the inwardly flange-shaped annular portion, at the upper end of the tube portion and is arranged near the coolant/filter means, a desirable arrangement is such that the annular portion contacts with the end surface of the coolant/filter means and the tube portion covers partly the outer periphery of the coolant/filter means in the axial direction. With this arrangement, the deflecting member can position and/or support the coolant/filter means. Partly covering the outer periphery of the coolant/filter means in the axial direction, for example, means covering the outer periphery of the coolant/filter means formed in the cylindrical shape partly in the axial direction, in other words, along the predetermined length in the axial direction. Further, can be prevented a so-called short pass such that the operating gas is discharged without passing through the coolant/filter means, by bringing the upper end portion of the tube portion of the deflecting member into contact with the outer periphery of the coolant/filter means.

In the gas generator including the above deflecting member, the deflecting member can position and/or fix the coolant/filter means. The positioning of the coolant/filter means can be performed, for example, by an inwardly shaping the deflecting member in flange and supporting the outer periphery surface of the end portion of the coolant/filter means with a flange side (that is, an upper end side) of the tube portion. By supporting the coolant/filter means in the above manner, the gas generator, in which the position of the coolant/filter means is not shifted even at a time of combustion of the gas generating means, can be obtained.

The housing forming an outer shell container of the gas generator can be formed by joining a diffuser shell and a closure shell. The diffuser shell has a cylindrical shape with a top and a gas discharge port formed on a circumferential wall thereof. The closure shell has a cylindrical shape with a bottom and closes the diffuser shell. Both of the shells can be formed by using various kinds of steel materials such as an iron or a stainless steel, and opening portions thereof can be joined to each other by various kinds of bonding methods.

The coolant/filter means used in the gas generator at least cools the operating gas generated by the combustion of the gas generating means. An example of such a coolant/filter means can be formed by winding a wire mesh into a laminated layered body or by winding an expanded metal to form multi layers. Naturally, any coolant which is made of the wire mesh or the expanded metal rolled to form multi layers can be used even if it functions for purifying the combustion product generated by the combustion of the gas generating means.

Further, the ignition means can be a means including only an electric ignition type igniter to be activated by the activating signal and also can be used in combination with a transfer charge to be ignited and burnt upon activation of the igniter and generate a heat gas and mist for burning the gas generating means if required.

As the gas generating means to generate the operating gas by the combustion, the conventionally known gas generating means can be used. Therefore, an azide gas generating means on the basis of an inorganic azide such as a conventionally and widely used sodium azide or the like, or so-called non-azide gas generating means which is not based on the inorganic azide. In this case, the gas generating means of the present invention can achieve a more significant effect in the case of using the gas generating means for generating the fluidized or semi-fluidized combustion product due to the combustion thereof, or the gas generating means for generating the alkali mist due to the combustion thereof to make the coolant/filter means eroded. This is because the deflecting member of the present invention can adhere the combustion product contained in the operating gas to remove by allowing the operating gas to strike against the member.

Activation of the gas generator of the present invention is performed such that the ignition means is activated on the activating signal, and then the flame and the heat mist generated from the ignition means ignites and burns the gas generating means to generate the operating gas for inflating the air bag. In general, the combustion product generated due to the combustion of the gas generating means is contained in the operating gas, and a part thereof can be removed while the gas is passing through the coolant/filter means. However, in the case that the combustion product is in a fluidized state or a semi-fluidized state, the combustion product cannot be removed by the coolant/filter means perfectly. But the above combustion product after passing through the coolant/filter means is accumulated in the housing after striking against the deflecting member or is adhered to the deflecting member so as to be removed from the gas.

The above gas generator for the air bag of the present invention constitutes an air bag apparatus by including an impact sensor which detects an impact to operate the gas generator, an air bag which introduces the gas generated in the gas generator to inflate, and a module case storing the air bag. The gas generator is stored in the module case together with the air bag (bag body) which introduces the generated gas to expand, and is provided as a pad module. When the gas generator is provided with an electric ignition type igniter to be activated by an electric signal, the pad module is combined with the impact sensor detecting the impact and a control unit outputting an activating signal to the gas generator in accordance by a signal inputted from the impact sensor, thereby forming an air bag apparatus.

In the air bag apparatus, the gas generator is activated by the impact sensor detecting the impact, and discharges a combustion gas from the gas discharge port of the housing. The combustion gas flows into the air bag, whereby the air bag breaks the module cover so as to expand out and forms a cushion for absorbing an impact between a hard structure in the vehicle and the passenger.

The gas generator for the air bag of the present invention can provide a gas generator with a simple structure in which it can restrict the discharge of the solid material generated in the housing due to the combustion of the gas generating means and also the flame due to the combustion of the ignition means is not directly discharged.

(2) Coolant/Filter Means Supporting Member

An object of the present invention is to provide a coolant/filter means supporting member, which can solve the problems of the above conventional coolant/filter means and provide a gas generator for an air bag in a simple structure, and to provide a gas generator for an air bag using the same.

A constituting member used in the gas generator for the air bag according to the present invention is a coolant/filter means supporting member which is arranged in the housing constituting the gas generator and that is (1) to position at a time of disposing the coolant/filter means and/or at a time of activating the gas generator, and/or (2) to prevent a short pass such that the operating gas does not pass through the coolant/filter means, and/or (3) to prevent the heat generated due to the combustion of the gas generating means from being transferred to the end surface of the housing where a gas discharge port is formed, and/or (4) to securely hold and fix the coolant/filter means due to an elasticity.

That is, there is provided a coolant/filter means supporting member in a gas generator for an air bag which is a constituting member used in a gas generator for an air bag including, in a cylindrical housing with a gas discharge port, a gas generating means to generate an operating gas for inflating an air bag and a cylindrical coolant/filter means for cooling and/or purifying the operating gas in the housing, and that comprises at least an annular portion arranged oppositely to either of end surface in the cylindrical housing and a wall portion contacting with an inner periphery of the coolant/filter means.

A wall portion constituting the coolant/filter means supporting member is formed to contact with the inner periphery of an end portion of the coolant/filter means in a state of the coolant/filter means supporting member arranged in the housing, to prevent a so-called short pass that the operating gas is discharged without passing through the coolant/filter means, and to decide a position of the coolant/filter means.

This wall portion can be, for example, formed by bending the annular portion in the peripheral direction into a "U-shaped" cross section. In addition, it is possible to form by vertically connecting a cylindrically formed member to the annular portion.

In the case of forming the wall portion by bending in the "U-shaped" cross section, desirably, an outside of the bent portion has a vertical surface to the annular portion and an inside of the bent portion is inclined towards the center of the annular portion. The vertical surface can be securely in contact with the inner surface of the coolant/filter means by forming the vertical surface in the outside of the wall portion. By forming the wall portion, in a step of assembling the gas generator, it is possible to eliminate a possibility such that, due to vibration or the like, the position of the coolant/filter means is shifted and the gas generating means enters below the coolant/filter means. In other words, the coolant/filter means supporting member is arranged in a state of reversing the diffuser shell having the cylindrical shape with a top and then, the supporting means decides a position for arranging the cylindrical coolant/filter means. At the time of disposing the coolant/filter means, there is a risk such that the gas generating means charged in a hollow portion of the coolant/filter means enters under the coolant/filter means in the case that the coolant/filter means is shaken due to the vibration or the like in manufacturing the gas generator. However, by forming the wall portion in the above shape, the gas generating agent never enter between the wall portion and the coolant/filter means and, thereby such a case that the gas generating means enters under the coolant/filter means can be avoided.

It is desirable to form a bent portion bent toward the coolant/filter means side in a circumferential edge of an annular portion which constitutes a part of the coolant/filter means supporting member and is arranged oppositely to the end surface of the housing. By forming the bent portion to be brought into contact with the outer periphery of the end portion of the coolant/filter means in a state of being arranged in the housing, a so-called short pass such that the operating gas is discharged without passing through the coolant/filter means at a time of activation the gas generator can be prevented, and also the coolant/filter means can be positioned. Desirably, the bent portion is formed so as to cover the outer periphery of the end portion of the coolant/filter means when the annular portion of the coolant/filter means supporting member is disposed to contact with the end surface of the coolant/filter means. A length of a portion extending from the bent portion along the outer periphery of the coolant/filter means can be suitably adjusted so that the outer periphery of the coolant/filter means is not closed.

Further, by arranging a distance between the bent portion and the wall portion to become equal to a thickness in the radial direction of the coolant/filter means disposed in the gas generator housing, the coolant/filter means can be held between both portions, whereby being able to securely position or fix the coolant/filter means.

In such case that a central opening is formed in the center of the annular portion, desirably, an inner diameter of the central opening is controlled so that an inner edge of the circular portion is brought into contact with the end surface of the inner-cylindrical member arranged in the gas-generator housing. By forming the opening in the above manner, the coolant/filter means supporting member can be positioned by the inner cylindrical member disposed in the housing and then, the coolant/filter means supporting member can decide a position of the coolant/filter means.

It is desirable that the annular portion of the coolant/filter means supporting member is formed so that, in a state of being disposed in the housing, at least a portion which contacts with the end surface of the coolant/filter means has an elasticity in the thickness direction thereof. An example of the annular portion can be one made of an elastic member such as a resin or the like, or can one made by being bent into a shape or a structure capable of achieving a proper elasticity. Accordingly, even when the cylindrical coolant/filter means disposed in the housing is not elasticated in the axial direction, the portion becomes a buffer portion to hold the coolant/filter means between upper and lower inner surfaces of the housing due to the elasticity.

Further, desirably, the coolant/filter means supporting member is made such that, in a state of being disposed in the housing, at least a portion which contacts with the end surface of the coolant/filter means is formed so as to prevent the heat from being transferred from the coolant/filter means to the housing. For example, at least a portion on the end surface of the coolant/filter means in the annular portion can be made of a heat insulating member such as a resin or the like, or alternatively, bent or the like into a shape capable of securing a heat insulating space between an inner surface of a diffuser shell and the coolant/filter means. Accordingly, the heat of the coolant/filter means increased due to cooling of the operating gas can be prevented from being transferred to the housing, whereby avoiding a damage to the air bag.

As mentioned above, it is desirable that the coolant/filter means supporting member, which comprises the annular portion opposite to the end surface of the housing, the bent portion formed in the outer periphery of the annular portion, and/or the wall portion formed in the annular portion, is formed as a single member. In this case, an example thereof can be one formed by press-molding the stainless steel. When the coolant/filter means supporting member is formed as a single member, effects such as to prevent a short pass of the operating gas, to avoid the heat transmission from the coolant/filter means to the housing, to buffer the coolant/filter means and/or to position and support the coolant/filter means can be obtained at the same time by forming and disposing a single member at a time of manufacturing the gas generator for the air bag, and thereby, the producing cost can be largely reduced.

In the coolant/filter means supporting member, when a position to dispose the coolant/filter means is decided by the wall portion, the wall portion has to be formed in a length capable of supporting at least the end portion of the coolant/filter means.

Further, by integrally forming the cylindrical wall portion, which contacts with the inner periphery of the end portion of the cylindrical coolant/filter means, with the annular portion so as to surround the inner periphery of the end portion of the cylindrical coolant/filter means by the wall portion, a so-called short pass such that the operating gas passes over the coolant/filter means can be inhibited. In this case, it is necessary that the wall portion surrounds the inner periphery of the end portion of the filter means entirely along the peripheral direction. Further, desirably, the wall portion is formed to contact with the inner periphery of the coolant/filter means so that the operating gas does not go through the portion between the wall portion and the inner periphery of the coolant to pass over the end surface of the coolant/filter means.

Further, the heat generated due to the combustion of the gas generating means can be inhibited from being transferred to the end surface of the housing where the gas discharge port is formed by making the annular portion of the coolant/filter means supporting member of a heat insulating material such as ceramics or a ceramic fiber, or by forming the annular portion into a shape and a structure capable of obtaining the heat-insulating space. Additionally, by making the annular portion of a material which can secure an elasticity freely extendable and compressible at least in the direction perpendicular with respect to the plane of the coolant/filter means supporting member (that is, the thickness direction of the annular portion), or by forming the annular portion in a shape and a structure capable of securing an elasticity freely extendable and compressible in the above direction, the annular portion can securely hold and fix the coolant/filter means in the housing due to the elasticity as an absorbing material.

Accordingly, in the above coolant/filter means supporting member, when the coolant/filter means supporting member of the gas generator for the air bag in which the annular portion having such a size as to cover the end surface of the coolant/filter means is integrally formed with the inner wall portion having such a size as to cover the inner periphery of the end portion of the coolant/filter means, it is possible to (1) position the coolant/filter means and (2) prevent a so-called short pass such that the operating gas passes over the coolant/filter means. In this case, desirably, the wall portion is formed to cover the inner surface of the end portion of the coolant/filter means entirely along the peripheral direction and the circumferential wall is formed in such a size as to contact with the inner periphery of the end portion of the coolant/filter means.

Further, in the coolant/filter means supporting member, by making at least the annular portion, which covers the end surface of the coolant/filter means, of a heat insulating material, or by forming the annular portion in a shape capable of securing the space, (3) it is possible to prevent the heat generated due to the combustion of the gas generating means from being transferred to the end surface of the housing where the gas discharge port is formed. And in the case of forming the annular portion so as to be elasticated in the direction vertical with respect to the plane thereof such as making the annular portion of a member having a proper elasticity or forming the annular portion in a structure having an elasticity, (4) the coolant/filter means can be securely held and fixed due to the elasticity.

The coolant/filter means supporting member is preferably used in a pyrotechnic gas generator particularly using the coolant/filter means, and there can be realized a gas generator for an air bag achieving a proper effect at a time of manufacture and activation.

That is, there is provided a gas generator for an air bag comprising, in a cylindrical housing with a gas discharge port, an ignition means to activate a gas generator, a gas generating means to generate an operating gas for inflating an air bag upon activation of the ignition means, a cylindrical coolant/filter means to purify and/or cool the operating gas, wherein a coolant/filter means supporting member formed as a single member is disposed near the cylindrical coolant/filter means. Such a coolant/filter means supporting member prevents the operating gas from passing between an end surface of the coolant/filter means and an inner periphery of the housing, and/or positions the coolant/filter means, and/or prevents the heat from being transferred from the coolant/filter means to the housing, and/or supports the coolant/filter means between the upper and lower inner surfaces of the housing due to an elasticity The above gas generator can be realized, for example, by arranging any one of coolant/filter means supporting members mentioned above near the cylindrical coolant/filter means disposed in the housing. In this case, desirably, that the coolant/filter means supporting member is arranged so as to bring the annular portion thereof into contact with the end surface of the coolant/filter means and to partly cover the inner periphery of the coolant/filter means in the axial direction. The coolant/filter means is positioned and/or supported by the coolant/filter means supporting means, and it is desirable that the gas generator is structured so that the position is not shifted even by the combustion pressure of the gas generating means.

The housing forming an outer shell container of the gas generator can be formed by joining a diffuser shell, which is formed in a cylindrical shape with a top and has a gas discharge port formed in a circumferential wall thereof, to a closure shell which closing the diffuser shell and has a cylindrical shape with a bottom. Both shells can be formed by using various kinds of steel materials such as an iron, a stainless steel or the like, and opening portions thereof can be joined to each other by various kinds of joining methods.

The coolant/filter means includes a structure achieving a function of removing the combustion product contained in the operating gas and a cooling function of the operating gas, in addition to the coolant/filter means made of a wire mesh used conventionally for cooling the operating gas generated due to the combustion of the gas generating means. Also, a coolant/filter, which is formed into a complex gap structure by using a laminated wire mesh body so as to cool the operating gas as well as to collect the combustion product in the operating gas, can be employed. Still, in the case that the coolant/filter means supporting member of the present invention is formed to have an elasticity in the thickness direction thereof, since this can function as an absorbing member, even a coolant/filter means, which is made of a plain-stitch wire mesh or an expanded metal and hardly elasticated in the axial direction, can be employed. The coolant/filter means is generally formed in a substantially cylindrical shape, and is arranged outside the portion where the gas generating means is stored. It is possible to provide an outer layer made of a laminated wire mesh body, a porous cylindrical body, an annular belt body or the like on an outer periphery of the coolant/filter means for the purpose of supporting and restricting the coolant/filter means from expanding due to the combustion of the gas generating means.

In the gas generator in accordance with the present invention, as the gas generating means stored in the housing in order to generate the operating gas by the combustion, a non-azide gas generating agent or the like which is not based on the inorganic azide in addition to the azide gas generating agent on the basis of the conventionally used inorganic azide, for example, the sodium azide, can be used and these are not limited to the specific gas generating means.

Further, the ignition means is used for igniting and burning the above gas generating means when activated upon the activating signal, and can be used in a structure being constituted only by the electric ignition type igniter to be activated on the activating signal, or in combination with the transfer charge to be ignited and burnt upon activation of the igniter, and to generate the heat gas and mist for burning the gas generating means, if required.

The gas generator for the air bag is accommodated in the module case together with the air bag (bag body) to introduce the gas generated in the gas generator so as to inflate, thereby forming the air bag apparatus. In the air bag apparatus, the gas generator is activated when reacting upon the impact sensor detecting the impact and the operating gas is discharged from the gas discharge port of the housing. The operating gas flows into the air bag, and then, the air bag breaks the module cover so as to inflate, thereby forming a cushion absorbing the impact between the hard structure in the vehicle and the passenger.

In accordance with the coolant/filter means supporting member of the gas generator for the air bag in the present invention, with a simpler structure, the short pass of the operating gas at the end surface of the filter means can be prevented so as to purify and/or cool all of the operating gas by the coolant/filter means, and the cooled clean operating gas can be discharged to the air bag. Also, increase of a temperature in the housing caused by the activation of the gas generator can be made less, particularly in the end surface of the housing where the gas discharge port is formed, and thereby a damage to the air bag due to the contact with the housing can be avoided.

Further, at a time of manufacturing the gas generator, the coolant/filter means supporting member can position the coolant/filter means, and therefore, the space for accommodating the gas generating means formed inside of the coolant/filter means can be secured at a fixed position. Further, since the coolant/filter means supporting member is formed so as to have an elasticity at least in a thickness direction thereof, it can also function as the absorbing means between the inner surface of the housing and the end surface of the coolant/filter means, thereby being able to securely fix the coolant means in the housing.

(3) Housing Having Structure to Prevent Short Pass

An object of the present invention is to provide a housing of a gas generator for an air bag in a simple structure which can securely support and fix the coolant means and can prevent a short pass of the operating gas, and a gas generator using the same.

The gas generator for the air bag in accordance with the present invention is characterized by a structure of the housing, and particularly characterized by a combined structure for arranging and fixing the coolant means.

That is, in the present invention, there is provided a gas generator for an air bag comprising, in a cylindrical housing with a gas discharge port, a gas generating means to generate an operating gas for inflating an air bag, and a cylindrical coolant means to cool and/or purify the operating gas in the housing, in which an outer peripheral edge of an end portion of the coolant means is adhered and/or supported a bent portion or a step portion formed on an inner surface of an upper end portion and/or an inner surface of a lower end portion of the cylindrical housing at a time of assembling the gas generator and/or at a time of activating the gas generator.

Desirably, the bent portion or the step portion formed on the inner surface of the upper end portion and/or the inner surface of the lower end portion of the cylindrical housing is formed so as to adhere and/or support the outer peripheral edge of either or both end portions of the coolant means at a time of assembling the gas generator and/or activating the gas generator, and thereby preventing the operating gas from passing between the end surface of the coolant means and the inner surface of the housing contacting therewith (a so-called short pass). In the present specification, the upper portion of the housing corresponds to a ceiling surface of the gas-generator housing, and the lower end portion corresponds to a bottom surface of the gas-generator housing. Further, the time when the gas generator is activated includes at least a time when the operating gas generated due to the combustion of the gas generating means passes through the coolant means.

Accordingly, in the present invention, the outer peripheral edge of the end portion in the coolant means may be adhered to and/or supported by the bent portion or the step portion formed on the inner surface of the upper end portion and/or the inner surface of the lower end portion of the cylindrical housing before the gas generator is activated, or after the gas generator is activated (for example, at a time when the operating gas passes through the coolant means).

The outer peripheral edge of the end portion of the coolant means can be adhered to and supported by the inner surface of the bent portion between the end portion and the circumferential wall portion of the cylindrical housing. In this case, it is possible to prevent the operating gas from passing between the end surface of the coolant means and the inner surface of the housing contacting therewith by adhering the outer peripheral edge of the end portion in the coolant means to the inner surface of the bent portion of the cylindrical housing. In this case, desirably in the housing, the inner surface of the circumferential wall portion in the upper end side and/or the lower end side is formed to be inclined from the end portion, spreading outwardly and radially. When it is formed in this manner, a gap functioning as a flow-path of the operating gas in the outside of the coolant means can be secured, and the entire surface of the coolant means can be utilized by the function of the gap. For example, when the housing is formed by a diffuser shell having a cylindrical shape with a top with the gas discharge port and a closure shell having a cylindrical shape with a bottom closing an open end of the diffuser shell, the inner surface of the circumferential wall portion at least in one shell can be formed to be inclined from the end portion, spreading outwardly and radially. In other words, at a time of forming the closure shell, the inner surface of the circumferential wall portion thereof can be formed in a shape spreading outwardly and radially, from the bottom surface towards the open end. As the shape mentioned above, in addition to an inverse conical trapezoidal shape, there can be employed a shape obtained by inclining from a peripheral edge of the bottom surface to spread and making the end portion rise up. However, in view of making a production of the housing easy, it is desirable to form the inner surface of the circumferential wall portion in an inverted conical trapezoidal shape so as to make the bent portion less.

Therefore, in accordance with the present invention, there is provided a gas generator for an air bag characterized in the housing having the above shape, in other words, the housing for the gas generator, in which the inner surfaces of the circumferential wall portions in the upper end side and/or the lower end side thereof are inclined to spread outwardly and radially from the end surface.

The bent portion can be formed between the circumferential wall portion of the housing and the upper end portion and/or the lower end portion of the housing so as to adhere the outer peripheral edge of the cylindrical coolant means onto the inner surface of the bent portion. Accordingly, the coolant means can be positioned at a time of assembling the gas generator, the coolant means can be fixed after assembling the gas generator, and then, the short pass of the operating gas can be effectively prevented at the coolant means end surface at a time of activating the gas generator. In this case, it is desirable that in the housing, an interior angle between the inner surface of the circumferential wall portion and the inner surface of the upper end portion and/or the inner surface of the lower end portion is to be 90 to 150 degrees and more preferably of 90 to 135 degrees. This is because a best gap width can be secured, in view of a size and a capacity of a whole of the gas generator, by adjusting the angle to be in the above range. In other words, the housing of the gas generator is as compact and light as possible, and, by adjusting the angle between the inner surface of the circumferential wall portion and the inner surface of the upper end portion and/or the inner surface of the lower end portion to be the above range, downsizing the housing of the generator can be obtained and also the gap forming the gas flow path can be formed.

The above housing can be formed by casting, forging, press-molding the diffuser shell having the gas discharge port and the closure shell forming the accommodating space to join the shells. Joining the shells can be performed with various kinds of welding methods, such as an electron beam welding, a laser beam welding, a TIG welding, a projection welding. In the case of forming the diffuser shell and the closure shell by press-molding various kinds of steel plates such as a stainless steel plate, manufacturing both shells becomes facilitated and a manufacturing cost can be reduced. Further, by forming the bent portion in both shells as little as possible, the press-molding can be easily performed. With respect to the material of the diffuser shell and the closure shell, a stainless steel plate is desirable, however, a material such as a nickel plated steel plate can be used.

In the above gas generator, in addition to a conventional coolant means made of the metal wire mesh and used for cooling the operating gas generated due to the combustion of the gas generating means, a coolant means such as to have functions for removing the combustion product contained in the operating gas and cooling the operating gas can be used. Further, it is possible to employ the coolant/filter formed in a complex gap structure by using the laminated wire mesh body to cool the operating gas and collect combustion residues in the operating gas. In the present invention, in view of supporting and fixing the coolant means by the bent portion formed in the end portion of the circumferential wall of the housing, the coolant means can employ such a structure as not to be deformed due to passage of the operating gas. In this case, the coolant means can be formed such that at least a tensile strength in the radial direction is between 2450 and 19600 N (between 250 and 2000 kgf), more preferably between 4900 and 14700 N (between 500 and 1500 kgf), or the like so as to have a strength enough to stop the coolant means from expanding outwardly and radially when the operating gas is cooled and/or purified. The above coolant means can be, for example, formed by using a plain stitch wire mesh or an expanded metal. Still, the outer periphery of the coolant means can be provided with an outer layer composed of the laminated wire mesh body, the porous cylindrical body, the annular belt body or the like to support the coolant, for the purpose of suppressing expansion due to the combustion of the gas generator.

Further, in the present invention, the coolant means which expands outwardly and radially at a time of cooling and/or purifying the operating gas can be used. In such a coolant means, desirably, the coolant means is formed so that the outer peripheral edge of the end portion of the coolant means which expands outwardly and radially is adhered to and/or supported by the bent portion or the step portion formed in the inner surface of the upper end portion and/or the inner surface of the lower end portion in the cylindrical housing. With this structure, when the operating gas passes through the coolant means, it is possible to prevent the operating gas from passing between the end surface of the coolant means and the inner surface of the housing contacting therewith (so-called short pass).

Accordingly, the coolant means used in the present invention is required to be structured such that, after the gas generator is activated, the outer peripheral edge of the end portion is adhered to and/or supported by the bent portion or the step portion in the housing, or adhered and/or supported furthermore, however, before activating the gas generator, it is not an essential requirement to adhere and/or support the bent portion or the step portion in the housing to the outer peripheral edge of the end portion of the coolant means.

As the gas generating means which burns to generate the operating gas, in addition to the azide gas generating agent on the basis of the conventionally and wildly used inorganic azide, for example, a sodium azide, the non-azide gas generating agent or the like which is not based on the inorganic azide can be used, and these are not limited to the specific gas generating means.

Further, the ignition means is used for igniting and burning the above gas generating means when activated upon the activating signal, and can be used in a structure being constituted only by the electric ignition type igniter to be activated on the activating signal, or in combination with the transfer charge to be ignited and burnt upon activation of the igniter, and to generate the heat gas and mist for burning the gas generating means, if required.

And, in the above housing, it is possible to arrange a short pass preventing means surrounding the inner periphery of the end portion of the coolant means, an absorbing and/or heat insulating member arranged between the coolant means end surface and the inner surface of the housing, a deflecting member arranged in a gap secured between the outer periphery of the coolant means and the inner wall surface of the housing to shield the gas discharge port, or the like, if required.

Further, in the present invention, there can be provided a housing of a gas generator for an air bag which is preferably used in the pyrotechnic type gas generator mentioned above.

That is, there is provided a cylindrical housing of a gas generator for an air bag to generate the operating gas for inflating the air bag upon the impact, wherein a bent portion or a step portion adhering to and/or supporting an outer peripheral edge of either or both end portions of coolant means disposed in the housing at a time of assembling the gas generator and/or at a time of activating the gas generator is formed on an inner surface of an upper end portion and/or an inner surface of a lower end portion in the cylindrical housing.

In terms of putting the housing into practice, the housing can be easily utilized according to the description of the gas generator for the air bag mentioned above.

Further, the above gas generator for the air bag is accommodated in the module case together with the air bag (bag body) to introduce the gas generated in the gas generator so as to inflate, thereby forming the air bag apparatus. In the air bag apparatus, the gas generator is activated when reacting upon the impact sensor detecting the impact and the operating gas is discharged from the gas discharge port of the housing. The operating gas flows into the air bag, and then, the air bag breaks the module cover so as to inflate, thereby forming a cushion absorbing the impact between the hard structure in the vehicle and the passenger.

In accordance with the present invention, while having a simple structure, the coolant means can be securely fixed even when the coolant means is exposed to the pressure generated by the operating gas passing through, and at a time of manufacturing the gas generator, the coolant means can be kept in a fixed position, and further, the housing for the air bag gas generator, in which a so-called short pass such that the operating gas is discharged from the gas generator without passing through the coolant means is effectively inhibited, can be realized.

Since the housing has a simple structure, manufacturing thereof can be proceed easily and also the manufacturing cost can be reduced.

(4) Coolant Composed of Laminated Wire Mesh

An object of the present invention is to provide a coolant/filter of a gas generator for an air bag which solves a problem in the conventional art mentioned above, being easy to be manufactured with a lower manufacturing cost as well as securing a satisfying safety in activation of the gas generator, and a gas generator using the same.

The coolant/filter in accordance with the present invention is mainly used for the purpose of cooling the operating gas for inflating the air bag in the gas generator for the air bag, and is formed by winding a plain stitch wire mesh being comparatively easily produced and inexpensive so as to form a cylindrical shape. By forming the coolant in this manner, the coolant/filter of the gas generator for the air bag which is manufactured easily with a lower manufacturing cost can be realized. This coolant/filter is structured such as to perform at least either of purifying and cooling the operating gas, and is the coolant and/or the filter used in the gas generator for the air bag.

Namely, the gas generator for the air bag in the present invention includes a coolant/filter disposed in the housing of the gas generator for the air bag in order to cool and/or purify the operating gas for inflating the air bag, in which the coolant/filter is formed in a cylindrical shape obtained by laminating the wire mesh, and has the pressure loss in the range of 9.8 to 980 Pa, preferably 98 to 980 Pa or 9.8 and 98 Pa at the flow rate of 1000 litter/minute at 20° C. The pressure loss is selected in view of effects and functions in the case of the coolant/filter applied to the gas generator. That is, if the pressure loss is smaller than 9.8 Pa, it is impossible to sufficiently achieve the function of cooling and purifying the operating gas generated due to the combustion of the gas generating means (the cooling and purifying function of the coolant/filter) when being used in the gas generator, and if the pressure loss is larger than 980 Pa, passage of the operating gas is disturbed when being used in the gas generator, and a pressure in the gas generator (that is, in the housing) becomes too high.

In accordance with the present invention, in view of effects or functions or the like of the above coolant/filter, the pressure loss is adjusted as described above in order to solve the above problems.

The pressure loss of the coolant/filter can be measured by flowing a predetermined amount of air from the inside of the coolant/filter. That is, in the opening portions of the cylindrically formed coolant/filter, a first supporting plate provided with an air-feeding pipe is attached to one end portion thereof and a second supporting plate closing so as to prevent the air from being leaked is attached to the other end portion thereof. Further, a second manometer is attached to the second supporting plate. Therefore, it is designed such that the air which enters inside from the pipe attached to the first supporting plate fixed to one end portion of the cylindrical coolant/filter is all flowed outside from the cylindrical side surface portion of the coolant/filter. In this case, it is necessary that the pipe feeding the predetermined amount of air has a sufficiently large cross-sectional area and a flat smooth inner surface in order to accurately measure the pressure loss. The pipe is provided with a first flow rate meter for feeding a predetermined amount of air into the coolant/filter. At this time, a seal means such as a packing is applied to a surface where the supporting plate and the end portion of the coolant/filter contact with each other, so as to strongly grip the coolant/filter by the supporting plate and prevent the air from leaking through the contacted surface. When supplying a predetermined amount of air in this state, a part of the air, which enters the inside of the cylindrical coolant/filter, flows out through the side surface portion thereof and a pressure is decreased. This can define a ventilating resistance of the coolant/filter. That is, a value, which is indicated by the second pressure manometer attached to the second supporting plate in one end portion, is a value of pressure loss in the coolant/filter.

This coolant/filter can be made of the plain stitch wire mesh, and for example, can be formed in a cylindrical shape. The plain stitch wire mesh corresponds to a structure obtained by combining metal wire materials (hereinafter, also referred to a "strand"), which extend in two directions, to cross each other, and there can be provided structures having various kinds of wire diameters and gap densities.

In particular, in the case of forming with the plain stitch wire mesh, since the plain stitch wire mesh is structured such as to have various kinds of wire diameters and gap densities, the wire diameter and the bulk density can be easily selected, and the pressure loss can be easily adjusted by laminating the mesh. Consequently, manufacturing and a manufacturing cost can be preferable.

Desirably, the coolant/filter in the present has a bulk density of 0.1 to 3.5 $g/cm^3$, preferably 1.0 to 3.5 $g/cm^3$, or 1.5 to 3.0 $g/cm^3$, or 2.0 to 3.0 $g/cm^3$. For example, the bulk density can be set in the range larger than 2.4 $g/cm^3$ but smaller than 3.5 $g/cm^3$ or smaller than 3.0 $g/cm^3$.

Further, it is desirable that the coolant/filter in the present invention is made of a wire mesh composed of a metal wire material having a wire diameter of 0.1 to 1.0 mm and, particularly it is desirable to be made of a wire mesh composed of a metal wire material having a wire diameter of 0.2 to 0.6 mm. If the coolant/filter of the present invention is made of the metal wire material having the wire diameter mentioned above, the coolant/filter can be hardly damaged by the heat of the operating gas when being applied to the gas generator, and can function satisfactory for cooling and purifying the operating gas. In particular, on account of avoiding a damage by heat of the operating gas, the metal wire material having a wire diameter larger than 0.3 mm and further the metal wire material having a wire diameter larger than 0.6 mm can be used. However, even in this case, it is necessary to include the pressure loss and the bulk density mentioned above, or a number of meshes per 1 inch square or the like.

Further, desirably, a tensile strength in the radial direction is set between 2450 and 19600 N (between 250 and 2000 kgf), and particularly desirably, the tensile strength is set between 4900 and 14700 N (between 500 and 1500 kgf). If the present coolant/filter is provided with such a tensile strength, the deformation thereof can be inhibited and the coolant can effectively cool and purify the operating gas when being applied to the gas generator and purifying the operating gas for inflating the air bag.

Further, at a time of manufacturing the coolant/filter, it is desirable to form that a compression margin in the axial direction in the case of applying force of 4900 N (500 kgf) in the axial direction is to be in the range of 0.1 to 10% of the axial length before compression, and it is particularly desirable to form so as to be in the range of 1 to 5%. In this case, the "compression margin" is a distance to be compressed in the axial direction thereof when the force of 4900 N (500 kgf) in the axial direction of the coolant/filter is applied, and thereby a rigidity in the axial direction can be confirmed.

Further, desirably the coolant/filter in the present invention is made of a wire mesh in which a number of meshes per 1 inch square (645.16 $mm^2$) is between 12 and 32, and particularly desirably, the number of the meshes is between 16 and 24. By using such a wire mesh, collecting and cooling effects of the combustion product can be obtained, and at the same time, a damage by heat can be avoided. In other words, if the number of the meshes per 1 inch square is increased, the collecting and cooling effects of the combustion product can be improved, however, the coolant can be easily damaged by heat, and if the number of the meshes is reduced, the inverse actions are obtained, neither of which is preferable.

Still, in the present invention, the "bulk density" and the "tensile strength" can be measured with a standard method.

Further, in the case of forming the coolant/filter in the present invention with the plain stitch wire mesh, it is desirable to form so that either of strands which cross each other to two directions becomes parallel to the axial direction of the cylindrical coolant/filter. By adjusting the direction of one strand in the above manner, the coolant/filter can increase a strength against the axial direction. Further, by forming the other strand so as to be along the peripheral direction of the cylindrical coolant/filter, a strength of the coolant/filter against the direction (that is, the radial direction) to which the coolant is deformed by the operating gas can be improved. Further, by forming the coolant in such a manner, the case such that the strands are unraveled from each other at a time of producing can be eliminated. That is, unless the strands are woven in a direction vertical or parallel to the axial direction of the coolant/filter to be manufactured, the strands are unraveled, and a performance is deteriorated.

The present coolant/filter can be formed in the manner described below.

That is, the plain stitch wire mesh made of various kinds of steel material such as a stainless steel or the like is wound into a cylindrical body, and at least the end thereof is welded. The plain stitch wire mesh can be composed of a metal wire material, for example, having a wire diameter of 0.1 to 1.0 mm (desirably 0.2 to 0.6 mm), and can be wounded in the perpendicular direction to the extending direction of either of wire materials which cross each other. With respect to the winding number of the wire mesh, it is desirable to adjust so as to have a bulk density of 0.1 to 3.5 $g/cm^3$ (desirably 1.0 to 3.5 $g/cm^3$, or 1.5 to 3.0 $g/cm^3$, or 2.0 to 3.0 $g/cm^3$) and have a pressure loss of 9.8 to 980 Pa at 1000 litter/minute and 20° C. (desirably 9.8 to 98 Pa, or 98 to 980 Pa). Having the tensile strength in the radial direction is in the range of 2450 to 19600 N (desirably of 4900 to 14700 N), it is desirable to have a compression margin of 0.1 to 10% (desirably 1 to 0.5%) thereof, compressing in the axial direction by force of 4900 N.

With respect to winding the plain stitch wire mesh into the cylindrical body, a plain stitch wire mesh in a strip shape can be wound so as to form a multi-layer, and additionally, plain stitch wire meshes wound in a cylindrical shape can be combined so as to form a multi-layer.

As the stainless steel of the wire mesh material, such as SUS304, SUS310S, SUS316 (in JIS standard codes) can be used. SUS304 (18Cr-8Ni-0.06C) exhibits an excellent corrosion resistance as an austenite stainless steel.

A reinforcing ring body having a plurality of through holes in an entire periphery thereof can be fitted to both or either of the outside and the inside of the present coolant/filter, however, this is not necessarily required. Further, the present coolant/filter can be formed to have a double structure by being combined with a cylindrically formed wire mesh body having a different wire diameter, a bulk density, a pressure loss, a compression margin and/or a tensile strength if required.

Any one of elements constituting the above present invention has a satisfying characteristic, and can exhibit advantageous effects in the coolant/filter of the gas generator for the air bag. Namely, the present invention also provides the coolant/filter of the gas generator for the air bag with a structure described as follows. In this case, the following features (41) to (48) can be optionally combined.

(41) A coolant/filter used in a gas generator for an air bag characterized in that the coolant/filter is formed in a cylindrical shape obtained by laminating a wire mesh, and has a pressure loss of 9.8 to 980 Pa (desirably 9.8 to 98 Pa, or 98 to 980 Pa) at a flow rate of 1000 litter/minute at 20° C.

(42) A coolant/filter used in a gas generator for an air bag characterized in that the coolant/filter is a bulk density of 0.1 to 3.5 g/cm$^3$ (desirably 1.0 to 3.5 g/cm$^3$, or 1.5 to 3.0 g/cm$^3$, or 2.0 to 3.0 g/cm$^3$).

(43) A coolant/filter used in a gas generator for an air bag characterized in that the coolant/filter is formed by using a metal wire material with a wire diameter of 0.1 to 1.0 mm.

(44) A coolant/filter used in a gas generator for an air bag characterized in that the coolant/filter is formed so that a compression margin in the case of applying a force of 4900 N in the axial direction thereof is 0.1 to 10% of an axial length before compressing the coolant/filter.

(45) A coolant/filter used in a gas generator for an air bag characterized in that the coolant/filter is formed to have a tensile strength in the radial direction is between 2450 and 19600 N.

(46) A coolant/filter used in a gas generator for an air bag characterized in that the coolant/filter is formed in a cylindrical shape by using a wire mesh, and is formed so that either of wire materials, which cross each other to constitute the wire mesh, is along the axial direction of the coolant/filter.

(47) A coolant/filter used in a gas generator for an air bag characterized in that the coolant/filter is formed by using a wire mesh such that a number of meshes per 1 inch square (645.16 mm$^3$) is between 12 and 32.

(48) A coolant/filter used in a gas generator for an air bag characterized in that the coolant/filter is made of a wire mesh, and the wire mesh is a plain stitch wire mesh formed by plain-weaving a metal wire material.

Further, in the gas generator for the air bag, the gas generator for the air bag of the present invention can be obtained by using the coolant/filter for cooling the operating gas.

That is, there is provided a gas generator for an air bag comprising, in a housing with a gas discharge port, a gas generating means to generate an operating gas for inflating an air bag and a coolant/filter to cool the operating gas, in which the coolant/filter in accordance with the present invention is used as the coolant/filter.

In this gas generator, preferably, a gas generating means for to generate a mist in a molten state as a by-product produced due to the combustion is employed. An example thereof may be a gas generating agent containing a fuel and an oxidant and employing a basic copper nitrate as the oxidant. As the fuel, a guanidine derivative or a mixture thereof can be used.

In the case that the gas generating means which generates the mist in the molten state as the by-product due to the combustion is used, preferably, in a the housing, a deflecting plate is provided in a flow path of the operating gas which passes through the coolant/filter to the gas discharge port. By arranging the deflecting plate in the above manner, the mist in the molten state contained in the operating gas after passing through the coolant/filter strikes against and/or adhered to the deflecting plate, thereby being removed from the operating gas.

Accordingly, desirably, the deflecting member provided with the annular deflecting plate for deflecting the flow of the operating gas is included in the housing. And also desirably, the deflecting member is disposed so that the deflecting plate may cover the outside of the coolant/filter but at a distance, and the deflecting plate is formed to have a size covering at least the part projected horizontally from gas discharge port. In the case that a gap functions as the flow path of the operating gas is formed between the inner wall surface of the housing and the outer periphery of the coolant/filter, desirably, the deflecting plate exists in the gap, and the housing and the coolant/filter are arranged at a distance at least over the parts thereof projected horizontally from a gas discharge port.

The gas generator for the air bag is stored in the module case together with the air bag (bag body) to inflate due to introducing the gas generated in the gas generator, thereby forming an air bag apparatus. The air bag apparatus discharges the operating gas from the gas discharge port of the housing when the gas generator is activated, reacting upon an impact sensor detecting the impact. The operating gas flows into the air bag, and accordingly, the air bag breaks the module cover so as to inflate, and forms a cushion absorbing the impact between the hard structure in the vehicle and the passenger.

Since the coolant/filter of the present invention uses the plain stitch wire mesh which is comparatively easily produced and inexpensive, the coolant/filter of which manufacturing cost is restricted can be realized. Further, at manufacture of the coolant/filter, the coolant/filter is formed simply by winding the wire mesh, thereby facilitating a manufacture of the coolant/filter itself.

Further, in the gas generator using the coolant/filter, it is possible to realize a gas generator for the air bag which can restrict a whole capacity and weight, and securely remove the solid mist generated due to the combustion of the gas generating means by the combination with the deflecting plate. Further, such a coolant/filter can hardly deformed even by passage of the operating gas, and accordingly, a so-called short pass of the operating gas at the end surface of the coolant/filter can be effectively inhibited.

(5) Housing Having Bent Portion in Inlet Port of Igniter

In accordance with the present invention, there is provided a housing for a gas generator preferably used in manufacturing the gas generator with a restricted overall height, in which the problems mentioned above is solved and the igniter included in the ignition means is securely fixed, and a gas generator with a restricted overall height.

The housing of the gas generator for the air bag in accordance with the present invention is characterized by a shape and a structure of a portion for arranging and fixing an igniter or a member for fixing the igniter.

That is, the housing of the gas generator for the air bag according to the present invention is a cylindrical housing used in a gas generator for an air bag which generates an operating gas for inflating the air bag upon the impact, characterized in that the cylindrical housing has, in either end surface thereof, an opening portion for inserting and fixing an igniter or an igniter supporting member arranged in the housing, the opening portion is provided with a connecting portion for fixing the inserted igniter or igniter supporting member, and the connecting portion is provided in inner side of the housing rather than on the end surface having the opening portion. The opening portion provided in either end surface of the cylindrical housing can be formed so as to be provided with a tubular portion bent inside the housing.

Accordingly, even at the same height of the housing, it is possible to increase an internal capacity thereof, and an end of the tubular portion bent inside the housing supports an under plate which is arranged in the housing to support the gas generating means so as to block movement of the under plate in the direction of stress (that is, in the opposite side supporting the gas generating agent)

The opening portion formed in a bottom surface of the cylindrical housing is provided with the connecting portion for fixing the igniter or the igniter supporting member inserted to the opening portion. The igniter or the igniter supporting member can be fixed, for example, by a welding or the like. Further, the igniter can be provided in the vicinity thereto with a transfer charge to be ignited and burnt upon an activation of the igniter for generating a heat gas and mist to burn the gas generating means, whereby forming the ignition means. The igniter is formed by being provided with a metal portion for arranging and fixing in the housing, and this metal portion can be integrally formed with a portion to be activated upon the activating signal by a resin material or the like, or alternatively, both portions can be integrally formed by crimping the metal portion. In the case of directly accommodating the igniter in the opening portion, it is possible to integrally fix the metal portion to the connecting portion of the opening portion with a welding or the like. Further, in the case that the igniter supporting member for arranging the igniter in the housing is provided, it is possible to integrally fix the igniter supporting member in which the igniter is fixed to the connecting portion of the opening portion with a welding or the like. For example, in the case of the gas generator in which the inner cylindrical member is arranged in the housing and the ignition means accommodating chamber is defined in the inside thereof, the igniter can be fixed to the lower end opening of the inner cylindrical member by crimping. In this case, the inner cylindrical member functions as the igniter supporting member. Accordingly, in such a state, the inner cylindrical member can be integrally fixed to the connecting portion of the opening portion by a welding or the like. If the igniter supporting member or the igniter is integrally fixed to the connecting portion of the opening portion by a welding or the like, these portions can be prevented from dropping. At this time, by providing the connecting portion of the opening portion for fixing the igniter supporting member or the igniter inside the housing rather than on the end surface having the opening portion of the housing, it is possible to restrict the overall height of the housing.

In the present invention, the housing is realized by the substantially cylindrical housing, in which the connecting portion for fixing the ignition supporting member or the ignition is provided inside rather than on the end surface of the housing, that is, in the center in the axial direction of the housing. In this case, a rib in a concavo-convex shape could be formed on the end surface of the housing in order to secure the strength, and, at this time, the connecting portion may be provided inside the housing rather than the most protruding portion in the housing.

Further, in accordance with the present invention, there can be also provided a cylindrical housing used in a gas generator for an air bag to generate an operating gas for inflating an air bag upon the impact, characterized in that an opening portion provided with a tubular portion bent inside the housing is formed on either end surface of the cylindrical housing.

In this housing, the opening portion is formed on either end surface, and the opening portion is provided with the tubular portion bent inside the housing.

In the present invention mentioned above, the opening formed in the end portion of the housing is formed so that the igniter or the igniter supporting member arranged in the housing is stored, and the tubular portion formed in the opening is formed so as to be in inner contact with the outer periphery of the igniter or the inner tube member. Further, it is desirable that the tubular portion, with which the opening portion on either end surface of the housing is provided, is formed in the range of 10 to 100% of the axial length of the housing. Further, desirably, the tubular portion is formed to have the axial length of 4 to 37 mm. This is because, by forming the tubular portion to have the above length, the igniter supporting member or the igniter stored in the opening portion is inhibited from being shaky, and can be supported more securely. Further, in the case of setting the length of the tubular portion to 100% of the axial length of the housing, since the tubular portion itself can function as the inner cylindrical member, it is possible to form a so-called double cylinder type gas generator in which the interior of housing is partitioned into two chambers only by two members, that is, the diffuser shell and the closure shell.

Further, desirably in the above housing, the periphery of the opening portion is inclined inside the housing towards the center of the opening portion at the end surface having the opening portion. This is because, by forming in the above manner, even in the case of welding the igniter supporting member or the igniter near the inlet port of the opening portion, the welded portion can be provided inside rather than the end surface of the housing, that is, in the center in the axial direction of the housing. Further, in view of structure, by forming the periphery of the opening portion to be inclined, it is possible to prevent the stress from being concentrated in this portion.

The above housing above can be formed by a diffuser shell with the gas discharge port having the cylindrical shape with the top, and the closure shell having the cylindrical shape with the bottom and forming the inner space of the housing together with the diffuser shell, and in this case, the opening can be formed in the closure shell side.

Each of the shells can be formed by a casting or a forging as well as a press-molding of various kinds of metal materials such as the stainless steel. The shells formed by various kinds of methods can form the inner space for accommodating the gas generating means or the like by being integrally joined in such a state as to face each other oppositely Both shells can be joined by various kinds of welding methods, for example, an electron beam welding, a laser beam welding, a TIG welding, a projection welding or the like. In the case that the diffuser shell and the closure shell are formed by press-molding various kinds of steel plates such as a stainless steel plate or the like, both of the shells can be easily manufactured, and the manufacturing cost can be reduced. With respect to the material of the diffuser shell and the closure shell, a stainless steel is particularly desirable, however, a material such as a nickel plated steel plate may be employed.

Further, the present invention also provides a gas generator for an air bag characterized by being formed with the housing.

That is, there is provided a gas generator for an air bag comprising, in a cylindrical housing with a gas discharge port, an ignition means which includes an igniter to be activated upon the activating signal, a gas generating means to generate an operating gas for inflating the air bag, in which the housing according to the present invention is used as the cylindrical housing.

The ignition means is activated upon the activating signal or the like, used for igniting and burning the gas generating means, and constituted only by an electric ignition type igniter to be activated upon the activating signal, and further can be used in combination with a transfer charge to be ignited and burnt upon the activation of the igniter for generating a heat gas and a mist to burn the gas generating means, if required. In the gas generator in which the inner cylindrical member is arranged in the housing and the ignition means accommodating chamber is defined in the inner cylindrical member, the ignition means including the igniter is stored and fixed in the inner cylindrical member, and the inner cylindrical member is stored and fixed in the opening portion formed in either end of the housing. That is, in this case, the inner cylindrical member functions as the igniter supporting member. Further, it is possible to directly fix the igniter including the metal portion to the opening portion, and in this case, the metal portion is integrally fixed to the connecting portion of the opening portion by a welding or the like.

In this gas generator, it is necessary to use a housing for the gas generator having at least the above features of the present invention, however, it is possible to suitably adjust the other structure than the housing, for example, a composition and a shape of the gas generating means, existence of the coolant, the filter or the like for cooling and/or purifying the operating gas generated due to the combustion of the gas generating means, or the like, in correspondence to the activating performance. For example, with respect to the gas generating means to burn for generating the operating gas, in addition to an azide gas generating agent based on the conventionally and widely used inorganic azide such as a sodium azide, a non-azide gas generating agent or the like not based on the inorganic azide can be used. Further, with respect to the housing itself, the structure other than the portions in the vicinity of the opening portion in either end of the above, such as a size and a number of the gas discharge port, a size of the housing, a whole shape, can be suitably adjusted in correspondence to the operating performance, the accommodating space or the like.

The gas generator for the air bag mentioned above is stored in a module case together with an air bag (bag body) to inflate by introducing the gas generated in the gas generator, thereby forming an air bag apparatus. In the air bag apparatus, the gas generator is activated when reacting upon the impact sensor detecting the impact and an operating gas is discharged from a gas discharge port. The operating gas flows into the air bag, whereby the air bag breaks the module cover so as to inflate, and forms a cushion absorbing the impact between a hard structure in the vehicle and the passenger.

In accordance with the present invention, it is possible to provide a housing which is preferably used in manufacturing the gas generator which has a simple structure and a restricted overall height, and can securely fix the igniter included in the ignition means, and the gas generator with a restricted overall height.

In particular, in the case that the opening portion formed on either end surface of the cylindrical housing and storing the igniter or the like is provided with the tubular portion bent inside the housing, an end of the tubular portion is useful for supporting the under plate supporting a gas generating means in the combustion chamber.

Further, although the housing of the present invention can restrict the overall height, it is possible to further increase the internal capacity in the housing, in the gas generator having the same outer diameter and height.

DESCRIPTION OF CODES 1 or 101 Diffuser Shell
2 or 102 Closure Shell
3 or 103 Housing
4 Inner Cylindrical Member
5 or 107 Coolant/Filter
6 or 104 Igniter
7 or 105 Transfer Charge
8 or 106 Gas Generating Agent
11 Gas Discharge Port
12 Supporting Portion
13 Ventilating Portion
16 Annular Portion
17 Wall Portion
18 Deflecting Member
19 Tube Portion
19 Inner Cylindrical Member
21 Expanded Portion
23 Central Opening
50 (Diffuser Shell Side) Circular Portion
51 (Diffuser Shell Side) Inclining Portion
52 (Diffuser Shell Side) Circumferential Wall Portion
54 (Closure Shell Side) Circular Portion
55 (Closure Shell Side) Circumferential Wall Portion
56 (Closure Shell Side) Bent Portion
57 (Diffuser Shell Side) Bent Portion
150 Coolant/Filter Means Supporting Member
151 Annular Portion
152 Wall Portion
154 Bent Portion
321 Stainless Steel Strand
321a, 321b Strand
200 Gas Generator
201 Impact Sensor
201 Semiconductor Type Acceleration Sensor
203 Module Case
204 Air Bag
207 Steering Wheel

PREFERRED EMBODIMENTS FOR THE INVENTION

The respective embodiments of the present invention will be described with reference to the drawings.

A gas generator for an air bag provided with the capabilities mentioned above of the present invention can be realized in the following embodiments.

Embodiment 1

(1) Deflecting Member

Figure 1:
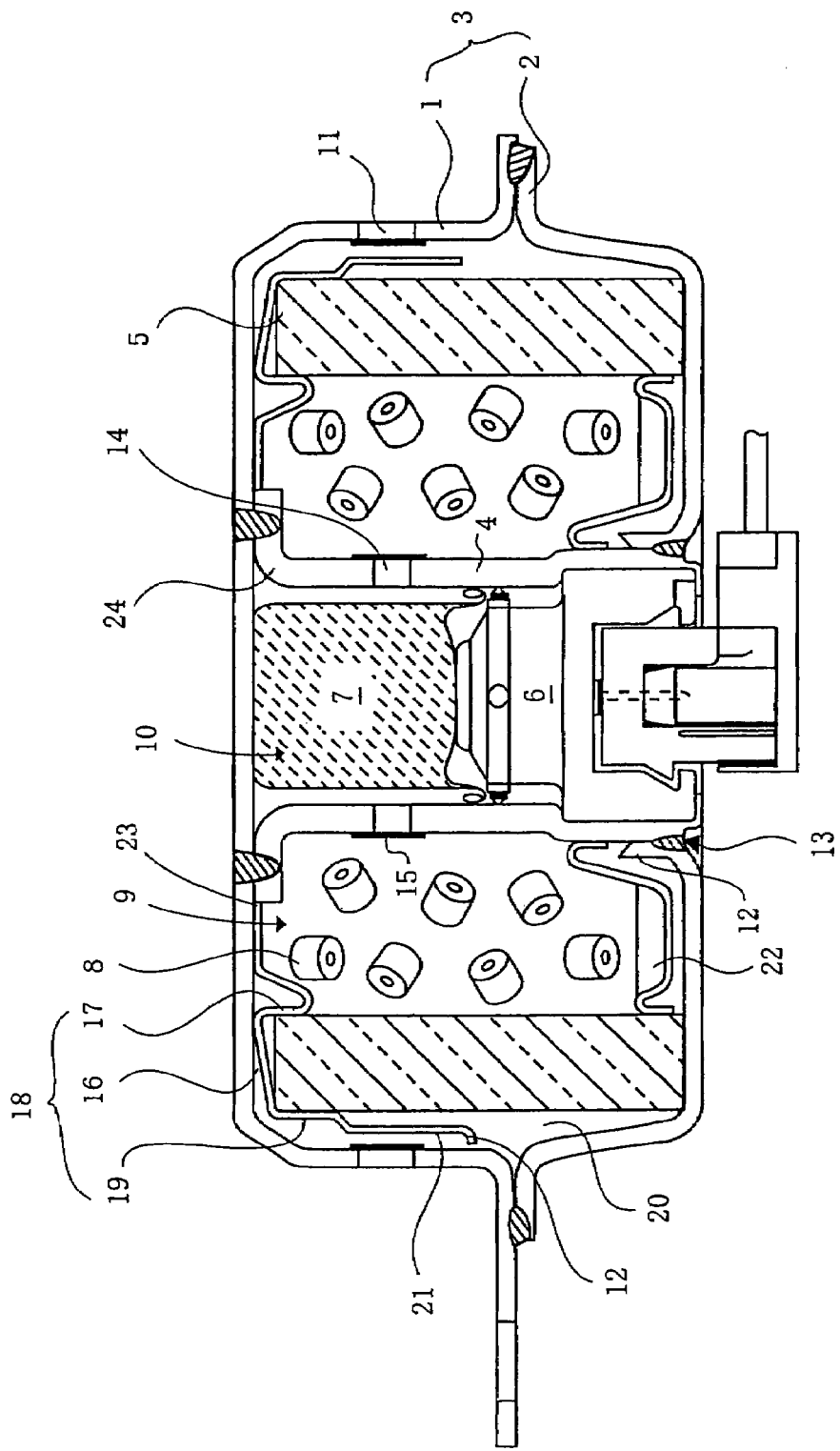
FIG. 1 is a cross sectional view showing a gas generator for an air bag using a deflecting member or the like in embodiment according to the aspects (1) and (4) of the present invention.

FIG. 1 is a vertical cross sectional view showing one embodiment of a gas generator for an air bag in accordance with the present invention. The gas generator shown in this drawing comprises a housing 3 which is formed with a diffuser shell 1 in a cylindrical shape with a top having a gas discharge port 11 and a closure shell 2 in a cylindrical shape with a bottom closing the diffuser shell 1, and that includes an ignition means constituted of an electric type igniter 6 and a transfer charge 7 and a gas generating means (which is, a gas generating agent 8) to generate an operating gas for inflating the air bag on the actuation of the ignition means, and further, coolant/filter means (which is, a coolant 5) to cool the operating gas generated by the combustion of the gas generating agent 8 is disposed between a combustion chamber 9 storing the gas generating agent 8 and the housing 3. And, a deflecting member 18 having a tube portion 19 is arranged in the end portion of the diffuser shell 1 side of the coolant 5.

The ignition means is stored in an ignition means accommodating chamber 10 which is secured in a inner cylindrical member 4 having a flange portion 24 welded to the inner surface of an upper portion inside the housing 3, and a space where the ignition means is stored can be communicated with the combustion chamber 9 provided in the outside of the cylindrical member via a plurality of flame transferring ports 14 formed in a circumferential wall of the inner cylindrical member 4.

In this embodiment, the gas generating agent 8, which generates a fluidized or semi-fluidized combustion product due to the combustion, can be used as the gas generating means stored in the combustion chamber 9. Even such a gas generating agent 8 can be used because the combustion product generated due to the combustion can be unfailingly removed by using a deflecting member 18 described below. An example of the gas generating agent 8 can be a gas generating agent 8 containing a fuel and an oxidant in which the basic copper nitrate is used as the oxidant.

Further, as the coolant 5 disposed on the outside in the radial direction of the combustion chamber 9, a wire mesh coolant 5 formed into a cylindrical shape can be used in the present invention even if the wire mesh coolant has a little elasticity in the axial direction. This is because, by disposing the deflecting member described below, the assembly thereof can be realized. Such a coolant 5 can produced by winding an expanded metal or a plain-stitch wire mesh into a cylindrical shape.

In the present embodiment, the deflecting member 18 comprises a tube portion 19 partly covering an outer periphery of the coolant 5 in the axial direction, an annular portion 16 bent inwardly into a flange shape on the upper end portion of the tube portion 19 to contact with an end surface of the coolant 5, and a wall portion 17 integrally formed with the annular portion 16 to contact with an inner periphery of the coolant 5. Among these, the tube portion 19 is formed so as to have a shape and a length covering a gas discharge port 11 in the circumferential wall of the housing 3 from the inside of the housing 3.

The tube portion 19 is formed in a substantially cylindrical shape which covers from the end surface, on the diffuser shell side, of the coolant 5 to a portion where the gas discharge port 11 is formed, further extending downwards (i.e. to the closure shell 2 side). An expanded portion 21 expanding outwardly and radially is formed on the tube portion 19, and, because of this expanding portion, the tube portion is disposed without having most thereof contacted with the inner periphery of the housing 3 and the coolant 5. Accordingly, the operating gas, after passing through the coolant 5, strikes against the inner surface of the tube portion 19 in the deflecting member 18, and passes between the outer periphery of the tube portion 19 and the inner periphery of the housing 3 to be discharged from the gas discharge port 11. Further, this tube portion 19 prevents a flame discharged from such as the flame-transferring port 14 of the inner cylindrical member 19 including the ignition means inside from passing through the coolant 5 to be discharged from the gas discharge port 11 directly. Accordingly, the deflecting member 18 in this embodiment is formed so that the tube portion 19 extends more downwardly than the portions where the gas discharge port 11 and the flame transferring port 14 are provided.

In this case, when the tube portion 19 is too long, there is a risk such that the tube portion 19 is expanded out or deformed by a pressure of the operating gas generated due to the combustion of the gas generating means to close the gas discharge port 11. Therefore, in the present embodiment, even in the tube portion 19 with a sufficient length, in order to prevent the tube portion 19 from being expanded out by the pressure of the operating gas, a supporting portion 12 bent in a flange shape outwardly and radially is formed on the end portion of the opening side (which is the opening portion in the closure shell 2 side). The supporting portion 12 can stop the tube portion 19 expanding by the pressure of the operating gas since an end thereof contacts with the inner periphery of the housing 3.

Figure 2:
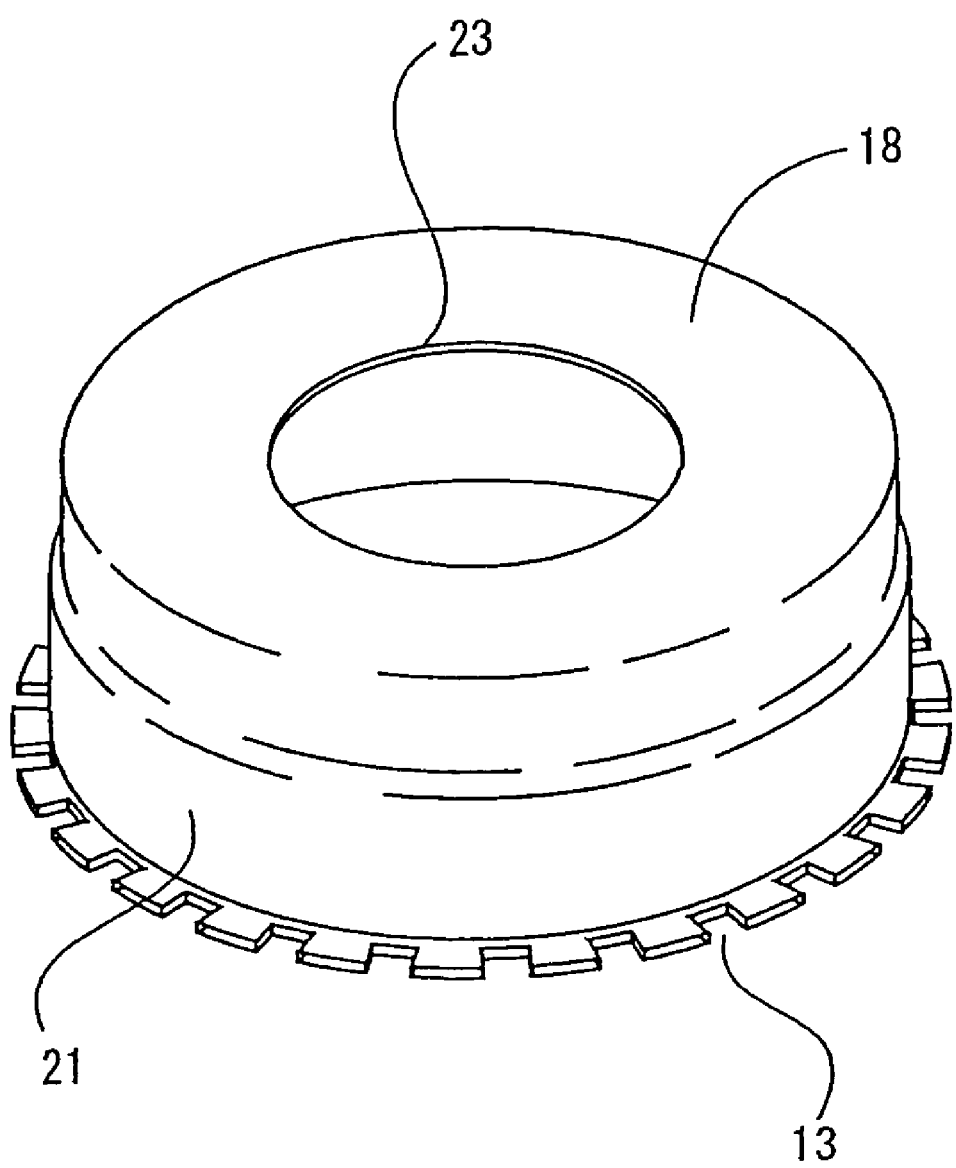
FIG. 2 is a perspective view showing a deflecting member in other embodiment according to the aspect (1) of the present invention.

In the present embodiment, as shown in a plan view of the deflector in accordance with another embodiment shown in FIG. 2, ventilating portions 13 notched at a predetermined interval along the peripheral direction inwardly in the radial direction are formed in the supporting portion 12. With these portions, the operating gas, after passing through the coolant 5, can reach the gas discharge port 11 through the ventilating portion 13. As described above, in the case of forming the supporting portion 12 at the end of the tube portion 19 in the deflecting member 18, the end of the supporting portion 12 contacts with the inner wall surface of the housing 3, however, at least a circumferential wall along the axis of the tube portion 19 is disposed so as not to be in contact with the inner periphery of the housing 3 and the coolant 5, whereby a flow path of the operating gas can be secured.

Further, the deflecting member 18 shown in the present embodiment comprises the inwardly flange-shaped annular portion 16, integrally formed with the tube portion 19, and the wall portion 17 covering an inner periphery of an upper portion (in the diffuser shell 1 side) of the coolant 5 is formed with the annular portion 16. Accordingly, the end portion in the diffuser shell side of the coolant 5 has the inner periphery—the end surface—the outer periphery thereof integrally surrounded, whereby it is possible to prevent a short pass of the operating gas between the end surface of the coolant 5 and the inner periphery of the housing 3.

Further, the tube portion 19 is bent in a crank shape to form an expanded portion 21 expanding outwardly and radially in the closure shell 2 side (the lower end side), the portion in the diffuser shell 1 side (that is, the annular portion 16 side) is formed to correspond to the outer diameter of the coolant 5. With this portion formed in this manner, the coolant 5 is interposed and positioned between the portion corresponding to the outer diameter of the coolant 5 in the tube portion 19 and the wall portion 17 of the annular portion 16. The coolant 5 held by the deflecting member 18 in this manner does not move due to passage of the actuating gas and securely A position of the coolant 5 gripped by the deflecting member 18 is kept at the predetermined position.

Figure 7:
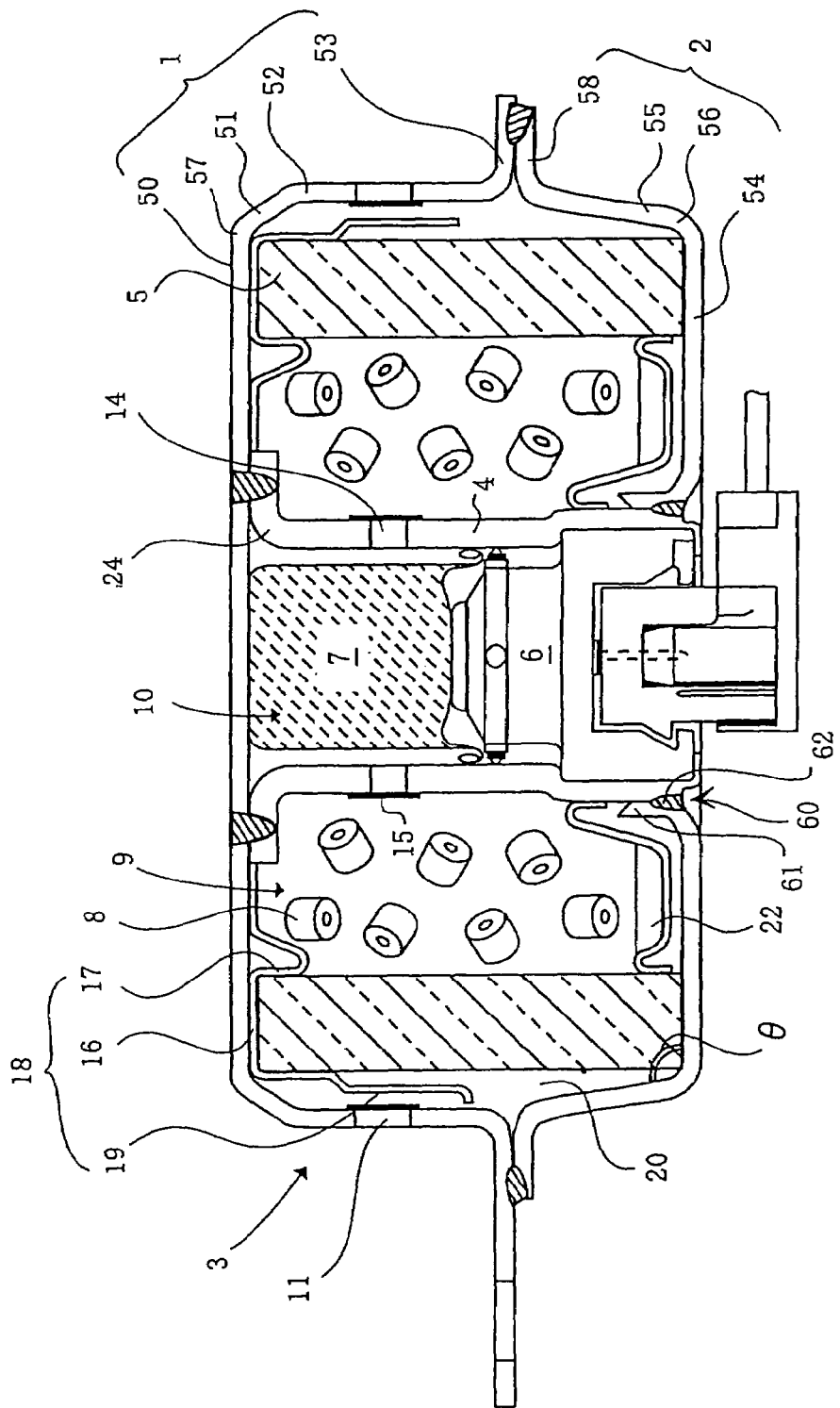
FIG. 7 is a perspective vertical cross sectional view showing a gas generator according to the aspects (1), (3) and (5) of the present invention.

Further, in the annular portion 16, the portion contacting with the end surface of the coolant 5, that is, a portion interposed between the end surface of the coolant 5 and the inner surface of the housing 3 is a buffer portion between the coolant 5 and the inner surface of the housing. That is, the portion is formed as a structure being freely elasticated in the axial direction of the coolant 5. By forming the portion in this manner, it becomes the buffer portion at a time of providing the coolant 5 means, and the coolant 5 can be held between the upper and lower inner surfaces of the housing 3 due to the elasticity. In accordance with the present embodiment, an elasticity is secured by bending the portion corresponding to the end surface of the coolant 5 so as to be inclined outwardly, however, any shapes capable of achieving an elasticity can be employed, and further, an elastic member can be formed by using such as a resin. Additionally in the present invention, as shown in FIG. 7, in the annular portion 16, the portion contacting with the end surface of the coolant 5 can be formed in a plate shape. In the gas generator shown in FIG. 7, the deflecting member shown in FIG. 2 is used.

Further, it is desirable that, in the annular portion 16 of the deflecting member 18, the portion corresponding to the end surface of the coolant 5 is formed to achieve a suitable heat insulating effect, which prevents the heat of the coolant 5 increased due to the cooling of the operating gas from being transferred to the diffuser shell 1 and further securely avoids a damage to the air bag. Such a heat insulating effect can be achieved, for example, by bending the portion outwardly as shown in the drawing (FIG. 1) so as to secure an heat-insulating space between the coolant 5 and the housing 3.

The annular portion 16 shown in the present embodiment has an end surface of its central opening 23 contacted with the flange portion 24 of the inner cylindrical member 4 provided in the housing 3 as shown in FIG. 1. Accordingly, a position of the deflecting member 18 is determined in the housing 3, and then a position of the coolant 5 is determined by the deflecting member 18. That is, the gas generator can be easily manufactured by coinciding an outer diameter of the flange portion of the inner cylindrical member 4 disposed in the housing 3 with an inner diameter of the central opening formed in the annular portion 16 constituting the deflecting member 18.

In the gas generator formed in the above manner, the transfer charge 7 is ignited and burnt by the igniter 6 actuated by an actuating signal, and the flame thereof is discharged into an accommodating space of the gas generating agent 8 after passing through the flame-transferring port 14 of the inner cylindrical member 4. The flame of the transfer charge 7 ignites and burns the gas generating agent 8. And even in the case that a part of the flame directly passes through the coolant 5, it strikes against the tube portion 19 of the deflecting member 18, thereby preventing the flame from being discharged directly through the gas discharge port 11. The operating gas generated from the gas generating agent 8 ignited by the flame of the transfer charge 7 passes through the coolant 5 and reaches a gap 20 secured between the outer periphery of the coolant 5 and the inner periphery of the housing 3. There is a case that in the operating gas produced from some kinds of the gas generating agents may include the combustion product in a fluidized state or a semi-fluidized state after passing through the coolant 5, but the combustion product strikes on and adheres to the tube portion 19 of the deflecting member 18 provided in the gap 20 to be removed from the operating gas. Further, a material generated due to such an erosion of the coolant 5 adheres to the tube portion 19 of the deflecting member 18 to be removed from the operating gas.

Accordingly, the combustion product or the like in the operating gas can be securely removed, and the operating gas discharged from the gas discharge port 11 is made clean.

In FIG. 1, the gas discharge port 11 and the flame-transferring port 14 are respectively closed by a seal tape 15, and the gas generating agent 8 is supported by the under-plate and stored in the combustion chamber. Further, the member described as the deflecting member 18 in the present embodiment can also function as a mist collecting member or a flame-preventing plate by the same structure.

Embodiment 2

(2) Coolant/Filter Means Supporting Member

Figure 3:
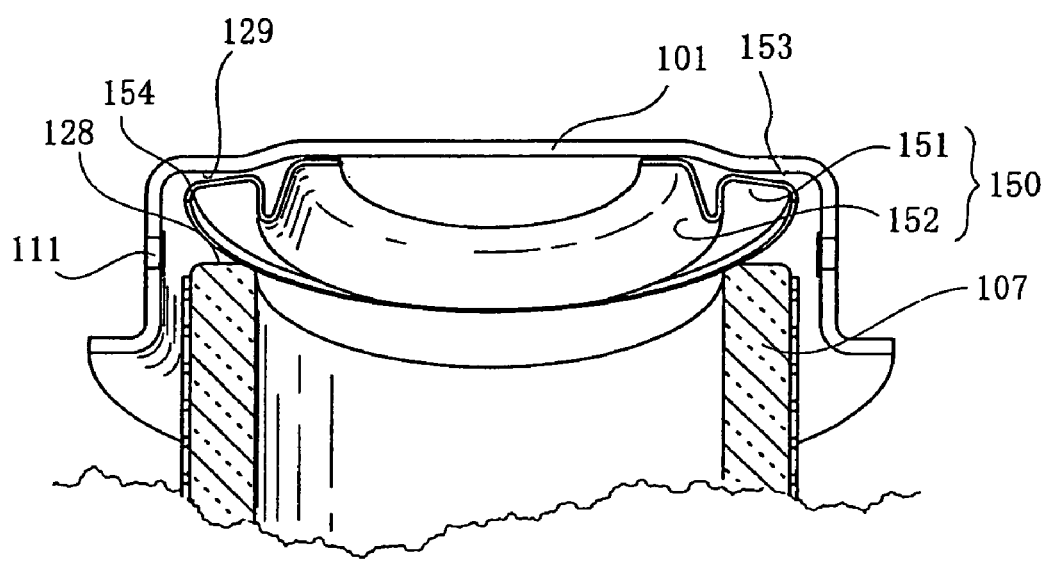
FIG. 3 is a perspective vertical cross sectional view showing one embodiment of a coolant/filter means supporting member according to the aspect (2) of the present invention.

FIG. 3 is a perspective vertical cross sectional view in a used state showing one embodiment of a coolant/filter means supporting member of a gas generator for an air bag in accordance with the present invention.

A coolant/filter means supporting member (a coolant means supporting member 150) shown in this drawing is structured such that an annular portion 151 arranged oppositely to a side where a gas discharge port 111 is formed, that is, an inner surface of an end portion of a diffuser shell 101, a bent portion 154 formed in the outer peripheral edge of the annular portion and a wall portion 152 which contacts with an inner periphery of an end portion of coolant/filter means (a coolant 107) at a time of being disposed are integrally formed in the housing of the gas generator by using various kinds of steel materials such as a stainless steel. This wall portion 152 is integrally formed by bending the annular portion 151 so as to have a size capable of covering a whole surface of the inner periphery of the end portion of the coolant 107 in the peripheral direction with the predetermined width. Further, a distance between the bent portion 154 and the wall portion 152 is set to a thickness of the coolant 107.

The wall portion 152 constituting a part of the coolant means supporting member 150 can function as positioning at a time of arranging the coolant 107 by making the outer periphery thereof contact with the inner periphery of the coolant 107, and can also prevent a so-called short pass such that the operating gas generated due to the combustion of the gas generating agent passes over the end surface of the coolant 107. Further, the bent portion 154 formed in the peripheral edge of the annular portion 151 also contacts with the outer peripheral edge of the end portion of the coolant 107 to function as positioning at a time of arranging the coolant 107 and prevent the short pass of the operating gas.

Further, the annular portion 151 constituting a part of the coolant means supporting member 150 and arranged oppositely to an end surface in which the gas discharge port is formed (that is, a ceiling inner surface of the diffuser shell 101) is formed so that a portion opposite to an end surface 128 of the coolant 107 is inclined downwards in the radial direction to the outer periphery. Accordingly, the coolant means supporting member 150 can exhibit an elasticity capable of freely being elasticated in the direction perpendicular to the plane. Further, by forming the annular portion 151 in the above manner, a space 153 is formed between the end surface 128 of the coolant 107 and an inner surface 129 of the upper portion of the housing. The space portion 153 can function as a heat insulating space 153 preventing the heat of the coolant 107 accumulated when the operating gas passes from being transferred to the end surface of the diffuser shell 101 on which the gas discharge port is formed. In this case, substantially the same effect can be expected even when the annular portion is made of a member such as one having a suitable elasticity and a heat insulating capacity but formed so as not to be inclined downwards in the radial direction to the outer periphery.

Embodiment 3

(2) Coolant/Filter Means Supporting Member

Figure 4:
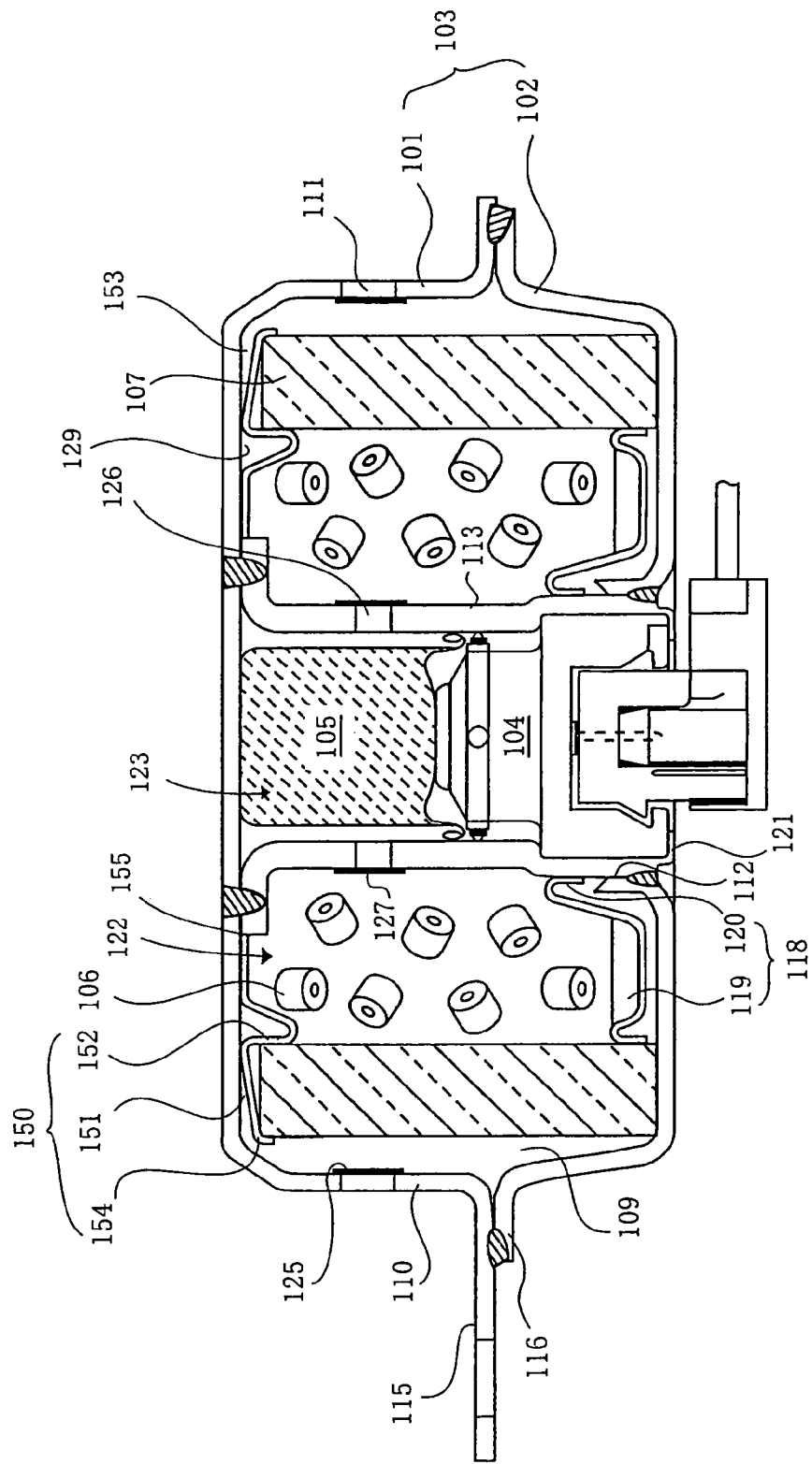
FIG. 4 is a vertical cross sectional view showing a gas generator for an air bag formed by using the coolant/filter means supporting member according to the aspect (2).

FIG. 4 is a cross sectional view showing a gas generator for an air bag including a coolant means supporting member 150 (that is, a coolant/filter means supporting member) shown in Embodiment 2 mentioned above.

The gas generator shown in this drawing is constructed by defining a housing 103 comprising a diffuser shell 101 and a closure shell 102 into two chambers of an ignition means accommodating chamber 123 and a gas generating agent combustion chamber 122 by an inner cylindrical member 113. The ignition means accommodating chamber 123 includes an igniter 104 and a transfer charge 105 as ignition means to be activated upon the impact for igniting and burning a gas generating agent 106, and the combustion chamber 122 includes the gas generating agent 106 to be ignited and burnt by the ignition means for generating the operating gas and a substantially disk-shaped under plate 118 for supporting the gas generating agent 106 as well as blocking a movement thereof. A plurality of gas discharge ports 111 are arranged at equal intervals in the peripheral direction in a circumferential wall portion 110 of the diffuser shell 101, and the gas discharge port 111 is closed by a seal tap 125. The inner cylindrical member 113 is arranged to be fitted in a central hole 112 of the closure shell 102. The diffuser shell 101 and the closure shell 102 form the housing 103 by overlapping respective flange portions 115 and 116 near a position on the central horizontal cross section in the axial direction of the housing 103 and joining both shells by a laser beam welding.

The coolant 107 (the coolant/filter means), which is disposed in the housing 101 in order to purify and cool the gas generated by the ignition and combustion of the gas generating agent 106, is arranged to surround the gas generating agent 106, and defines an annular chamber, that is, a combustion chamber 122 for the gas generating agent, in the periphery of the inner-cylindrical member 113. The coolant 107 can be formed by laminating stainless steel plain stitch wire mesh in the radial direction and compressing them in the radial direction and the axial direction. As the coolant 107, even a coolant which is hardly elasticated in the axial direction can be used. In particular, in the coolant 107 shown in FIG. 3, the coolant is formed shorter in the axial direction at a degree of the coolant means supporting member 150 arranged on the end surface 128 in the diffuser shell 101 side. A gap 109 is formed between the outer circumferential wall of the housing 103 and the coolant 107, and the gap 109 functions as a gas flow path.

Figure 5:
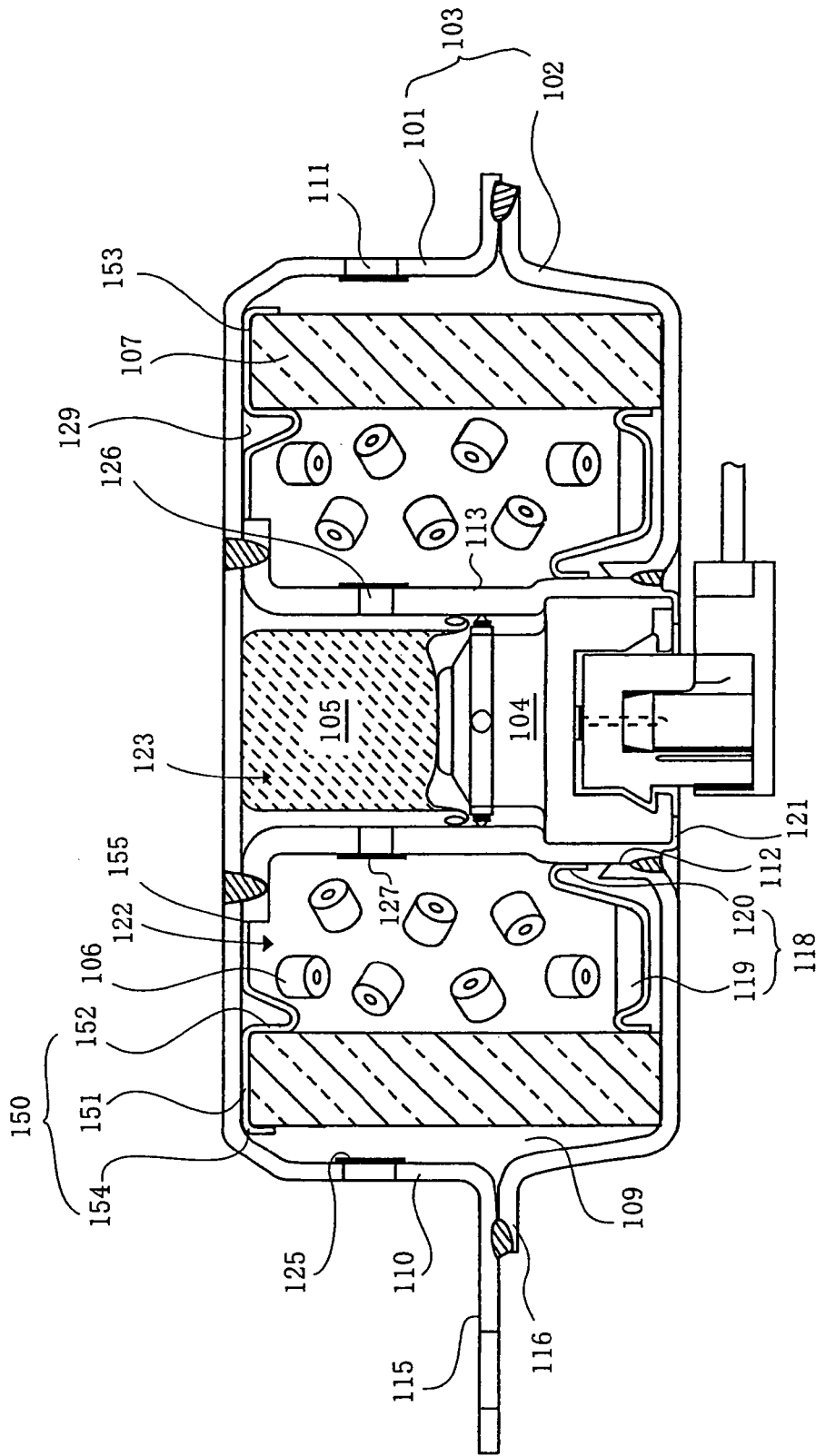
FIG. 5 is a vertical cross sectional view showing a gas generator for an air bag formed by using the coolant/filter means supporting member according to other aspect of the aspect (2).

The annular portion 151 of the coolant means supporting member 150 described in the Embodiment 2 mentioned above is arranged to be interposed between the axial end portion of the coolant 107 and the upper inner surface 129 of the diffuser shell 101. In the annular portion 151 arranged oppositely to the inner periphery of the housing, a portion where the end surface of the coolant contacts is formed to incline downwards in the radial direction to the outer periphery. And the annular portion 151 is formed integrally with the cylindrical wall portion 152 which covers the inner periphery of the upper portion of the coolant 107 (that is, the diffuser shell side). The annular portion 151 is held between the coolant 107 and the diffuser shell 101, whereby the space portion 153 is formed therebetween. The space portion 153 functions as a heat insulating space for preventing the heat from being transferred from the coolant to the diffuser shell. At the same time, the annular portion 151 is freely elasticated in the direction perpendicular to the plane, and it is possible to held the coolant 107 between the upper and lower end surfaces of the housing due with this elasticity. With respect to the annular portion, as in a gas generator for an air bag of another embodiment shown in FIG. 5, the annular portion can be arranged on the end surface of the coolant 107 without being inclined.

Further, since the coolant means supporting member 150 is provided with a wall portion 152 and a bent portion 154, the operating gas generated due to the combustion of the gas generating agent 106 does not pass over the end surface of the coolant 107. Accordingly, all of the operating gas passes through the coolant 107, and the suitably cooled operating gas in which the combustion product generated by the combustion is removed is discharged from the gas discharge port.

In this embodiment, the wall portion 152 is made by bending the annular portion 151 to be substantially "U-shaped". More particularly, the wall portion 152 is formed so that an outer side thereof (that is, a side where the coolant 107 contacts) has a surface vertical to the annular portion, and an inner side of the bent portion (that is, in the inner-cylindrical member 113 side) is inclined so as to be recessed toward the center of the annular portion. By forming the wall portion 152, it is possible to prevent the gas generating agent 106 stored in the combustion chamber 122 from entering into the end surface of the coolant 107 at a time of assembling the gas generator.

Further, an opening portion (that is, a central opening 155) having a size capable of contacting with a flange-shaped end surface of the inner-cylindrical member 113 is formed at the center of the annular portion 151. Accordingly, when the inner-cylindrical member 113 is fixed to the diffuser shell 101, the coolant means supporting member 150 is disposed, being positioned by the central opening 155, and the coolant 107 can be fixed, being positioned by the coolant means supporting member 150. Therefore, the gas generator can be assembled in more facilitated and secure manner.

Also, a substantially porous cylindrical perforated basket (not shown) can be disposed on the inner periphery of the coolant 107 to protect the coolant 107 from the flame due to the combustion of the gas generating agent 106 and prevent a direct contact between the gas generating agent 106 and the coolant 107.

The substantially disk-shaped under plate 118 arranged in the combustion chamber 122 of the gas generating agent defined in the outside of the inner-cylindrical member 113 in the housing 101 has a circular portion 119 contacting with the gas generating agent 106 and a central hole 120 in which the outer circumferential wall of the inner-cylindrical member 113 is fitted. The circular portion 119 supports the gas generating agent 106 and blocks the movement thereof to eliminate a risk such that the gas generating agent 106 is crushed due to a vibration and a surface area thereof is changed. A crimped portion 121 is formed in the end portion in the igniter 104-accommodated side in the inner-cylindrical member 113, and the igniter 104 is fixed by the crimped portion 121. Further, a plurality of flame-transferring ports 126 arranged at equal intervals are provided on the circumferential wall of the inner-cylindrical member 113, and the flame transferring ports 126 are closed by a seal tape 127.

In the gas generator shown in this drawing, the transfer charge 105 is ignited and burnt by the igniter 104 activated upon the impact, and the flame thereof breaks the seal tape 127 closing the flame-transferring port 126 of the inner-cylindrical member 113 and flows into the combustion chamber 122. The gas generating agent 106 in the combustion chamber 122 is ignited and burnt by the flame of the transfer charge 105 so as to generate the operating gas. The operating gas is purified and cooled while passing through the coolant 107, then passes through the gap 109, and finally breaks the seal tap 125 closing the gas discharge port 111 to be discharged from the gas discharge port 111.

In this gas generator, at a time of manufacturing, the coolant 107 can be positioned by the wall portion 152 and the bent portion 154 of the coolant means supporting member 150, and the coolant 107 can be securely fixed with the elasticity of the annular portion 151. Further, at a time of activation, since the short pass of the operating gas is restricted by the wall portion 152 and the bent portion 154 of the coolant means supporting member, all of the operating gas can be purified and/or cooled by the coolant 107. Further, since the annular portion 151 of the coolant means supporting member 150 prevents the heat accumulated in the coolant 107 from being transferred to the diffuser shell, the diffuser shell 101 does not gain a high temperature at activation of the gas generator, whereby eliminating a risk such as a damage to the air bag more reliably.

Embodiment 4

(3) Housing Which Prevents a Short Pass

FIG. 7 is a cross sectional view showing a gas generator for an air bag which comprises the housing for the gas generator in accordance with one embodiment of the present invention.

The gas generator shown in this drawing comprises, in a housing 3 with a gas discharge port 11, a ignition means including an electric type igniter 6 and the transfer charge 7, and the gas generating means (that is, the gas generating agent 8) to generate the operating gas for inflating the air bag upon activation of the ignition means, and further, a coolant/filter means (that is, the coolant 5) to cool the operating gas generated due to the combustion of the gas generating agent 8 is disposed between the combustion chamber 9 in which the gas generating agent 8 is stored and the circumferential wall portion of the housing 3. Further, the deflecting member 18 having the tube portion 19 is arranged in the end portion of the coolant 5 in the diffuser shell 1 side.

The ignition means is stored in the ignition means accommodating chamber 10, and this ignition means accommodating chamber 10 is obtained inside the inner cylindrical member 4 provided with the flange portion 24 welded to the inner surface of the upper end portion in the housing 3. The ignition means accommodating chamber 10 can communicate with the combustion chamber 9 provided in the outside of the cylindrical member via a plurality of flame-transferring ports 14 formed in the circumferential wall of the inner cylindrical member 4.

In this embodiment, the housing 3 comprises the diffuser shell 1 formed in substantially the cylindrical shape with the top having the gas discharge port, and the closure shell 2 formed in substantially the cylindrical shape with the bottom closing the diffuser shell. Both shells can be obtained by press-molding a stainless steel.

In the present embodiment, the diffuser shell 1 has a first circular portion 50 forming a ceiling surface (that is, an upper end portion) of the housing, an inclining portion 51 inclined downwards to surround the circular portion 50, a circumferential wall portion 52 descending perpendicularly to the circular portion from the inclining portion and provided with a plurality of gas discharge ports 11 along the peripheral direction, and a flange portion 53 extending in the radial direction from the circumferential wall portion. And on the other hand, the closure shell 2 has a second circular portion 54 which forms a bottom surface (that is, a lower end portion) of the housing and is provided with an ignition means receiving hole in the center, a circumferential wall portion 55 which is bent from a peripheral edge of the second circular portion 54 and inclines as to spread outwardly and radially, and a flange portion 58 spreading outwardly and radially from a end of the circumferential wall portion. Both shells formed in this manner are integrally formed by joining to each other.

In this housing 3, the circumferential wall portion 55 of the closure shell 2 is inclined towards the circumferential wall portion 52 which is wider outwardly and radially than the first circular portion 50 because of the inclining portion 51 of the diffuser shell 1, and the bent portion 56 formed between the second circular portion 54 of the closure shell 2 and the circumferential wall portion 55 is adjusted so that an interior angle θ thereof becomes between 90 and 135 degrees.

Further, in the present embodiment, the first and second circular portions 50 and 54 are formed in the same size. Accordingly, the outer periphery of the upper end of the coolant 5 disposed in the housing is supported by the bent portion 57 formed between the first circular portion 50 and the inclining portion 51 in the diffuser shell 1, interposing the deflecting member 18, and the outer periphery of the lower end surface of the coolant 5 is directly supported by the bent portion 56 formed between the second circular portion 54 and the circumferential wall portion 55 in the closure shell 2. As mentioned above, by supporting the outer peripheries of the upper and lower end of the coolant 5 by the bent portions 56 and 57 formed in the housing, at a time of disposing the coolant 5, the coolant is positioned and supported by the bent portions. Further, at a time of activating the gas generator, the coolant 5 is pressed to contact with, and is supported by the bent portions, whereby the movement thereof is blocked, and the upper end portion of the coolant 5 is surrounded by the deflecting member 18 so as to be adhered to the bent portion 57 of the diffuser shell 1, and the outer peripheral edge of the lower end of the coolant 5 is directly adhered to the bent portion 56 of the closure shell 2, thereby preventing the operating gas from passing between the inner surface of the housing and the coolant 5 (that is, the short pass).

In this case, with respect to forming the housing, a rib-like reinforcing member and/or a reinforcing step portion is formed in both or either of the first circular portion 50 of the diffuser shall and the second circular portion 54 of the closures shell so as to improve a strength of the housing.

The coolant 5 disposed in the housing preferably employs a structure which does not expand outwardly and radially by a pressure generated due to passage of the operating gas. This is because, if the coolant 5 is expanded due to passage of the gas, the gap 20 secured between the coolant 5 and the inner periphery of the housing is closed and does not actually function as a gas-flow path. Accordingly, the coolant 5 in the present embodiment is formed so that a tensile strength in the radial direction becomes 12054 N (1230 kgf).

The deflecting member 18 is useful in the case that the gas generating agent 8 generates the combustion product in a fluidized state or a semi-fluidized state due to the combustion. In other words, the deflecting member 18 can remove the combustion product generated due to the combustion of the gas generating agent by adhering the combustion product to the tube portion 19 thereof or by allowing the product to strike thereagainst to dorp. Further, in the deflecting member 18, since a annular portion 16 which contacts with the end surface of the coolant 5 is formed to have a suitable elasticity, even a wire mesh coolant 5 being a little elasticated in the axial direction can be used as the coolant 5 disposed in the outside of the combustion chamber 9 in the radial direction. Further, in the deflecting member 18, the wall portion 17 which contacts with the inner periphery of the coolant 5 is integrally formed with the annular portion 16. By this structure, the coolant 5 can be positioned and fixed, and a so-called short pass that the operating gas is discharged without passing through the coolant can be inhibited.

In the gas generator formed in the above manner, a transfer charge 7 is ignited and burnt by an igniter 6 activated by receiving the activating signal, and a flame thereof is discharged to the accommodating space for the gas generating agent 8 through the flame-transferring port 14 of the inner cylindrical member 4. The flame of the transfer charge 7 ignites and burns the gas generating agent 8, and even though a part thereof directly passes through the coolant 5, the flame strikes against the tube portion 19 of the deflecting member 18, thereby preventing the flame from being directly discharged through the gas discharge port 11. The operating gas generated from the gas generating agent 8 ignited by the flame of the transfer charge 7 passes through the coolant 5 to reach the inside of the gap 20 secured between the outer periphery of the coolant 5 and the inner periphery of the housing 3. In the case that the combustion product in a fluidized state or a semi-fluidized state is contained in the operating gas after passing through the coolant 5, the combustion product is removed from the gas by being allowed to strike against and adhere to the tube portion 19 of the deflecting member 18 disposed in the gap 20.

In FIG. 7, the gas discharge port 11 and the flame-transferring port 14 are respectively closed by the seal tape 15, and the gas generating agent 8 is supported by the under plate 22 and stored in the combustion chamber. Further, in the present embodiment, the member described as the deflecting member 18 can also function as a mist collecting member or a flame preventing plate in the same structure.

Embodiment 5

(4) Coolant Composed of Laminated Wire Mesh

"Coolant/Filter"

Figure 6:
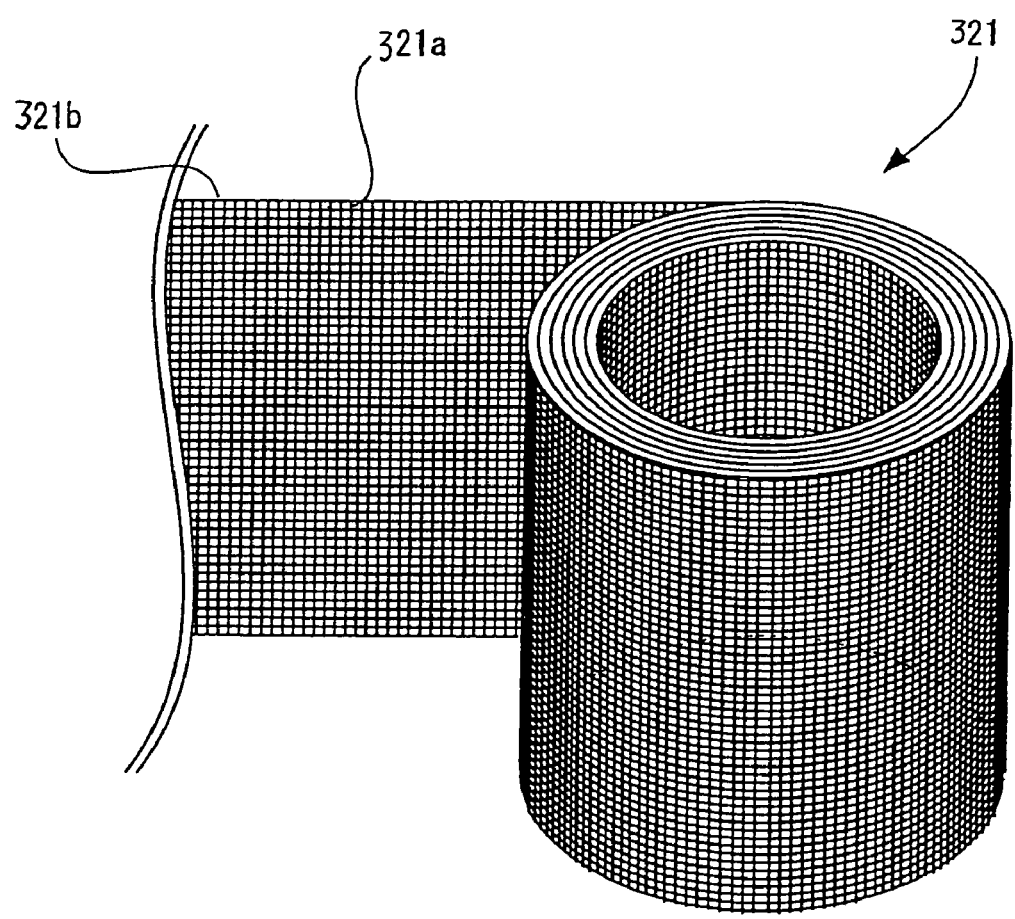
FIG. 6 is a perspective view showing one embodiment of a coolant/filter according to the aspect (4) of the present invention.

The coolant/filter 5 of the gas generator for the air bag in accordance with the present invention is formed, as shown in FIG. 6, by winding a plain stitch wire mesh made of a stainless steel strand 321 having a wire diameter of about 0.4 mm so as to form a cylindrical shape, and then laminating twelve layers in the peripheral direction. In the present embodiment, there is used the wire mesh in which a number of meshes per 1 inch square (645.16 $mm^2$) is 20. The coolant/filter 5 shown in this drawing is formed so that the strands 321a and 321b plain-stitched in two directions cross rectangularly to each other, the strand 321a extending to one direction is wound to the same direction as the axial direction of the cylindrically formed coolant/filter, and the other strand 321b is wound along the peripheral direction of the coolant/filter 5. Namely, in the present embodiment, there is used the plain stitch wire mesh obtained by combining the strands 321a and 321b so as to be crossed rectangularly to each other. In this embodiment, for example, the plain stitch wire mesh in which the wire diameter is 0.4 mm and the number of the meshes per 1 inch square is 20 is used, and in the case of compressing in the axial direction by the force of 4900 N, a compression margin in the axial direction becomes not more than about 5% of the margin before the compression. That is, the cylindrical coolant/filter is formed so that the axial length is about 31 mm and the compression margin is in the range of 1 to 1.5 mm. Further, the coolant/filter is formed so that the tensile strength in the radial direction is 12054 N (1230 kgf), the bulk density is 2.66 $g/cm^3$, and the pressure loss is in the range of 294 to 441 Pa (30 to 45 mm $H_2O$) at the flow rate of 1000 litter/minute at 20° C.

When the coolant/filter 5 is formed in this manner, manufacturing can be proceed easily and the manufacturing cost can be reduced. In other words, by using the plain stitch wire mesh which is comparatively easily produced and inexpensive, the manufacturing cost can be reduced, and the coolant/filter is manufactured simply by winding, and manufacture thereof can be facilitated.

Further, like the coolant/filter 5 shown in this embodiment, by arranging one strand 321a of the crossed strands 321 along the axial direction of the coolant/filter 5, the respective strands 321a and 321b can support and restrict it from expansion and compression in the axial and the radial direction. Consequently, when the coolant/filter 5 is disposed in the housing to purify the operating gas, the coolant/filter 5 does not expand radially and can be hardly deformed, thereby restricting the short pass of the operating gas between the end surface of the coolant/filter 5 and the inner surface of the housing. That is, when the operating gas passes, an accidental bending of the coolant/filter 5 can be avoided, and it is possible to prevent the operating gas from passing between the end surface of the coolant/filter 5 and the inner surface of the housing.

Embodiment 6

(4) Coolant Composed of Laminated Wire Mesh

"Gas Generator for Air Bag"

FIG. 1 shows an embodiment in which one embodiment of the coolant/filter 5 of the present invention is applied to the gas generator for the air bag. The gas generator includes the housing 3 comprising the diffuser shell 1 formed in a substantially cylindrical shape with a top and the closure shell 2 formed in a substantially cylindrical shape with a bottom, the central cylindrical member 4 disposed at the center portion in the housing 3, and the present coolant/filter 5 provided so as to surround the central cylindrical member 4.

The diffuser shell 1 is formed by press-molding the stainless steel plate, and a plurality of gas discharge ports 11 are arranged on the circumferential wall thereof in the peripheral direction at equal intervals. The closure shell 2 is formed by press-molding the stainless steel plate and has an opening hole in the center thereof, a hole edge thereof is bent outwardly in the axial direction so as to form the bent portion 12, and an inner periphery of the bent portion forms the central hole 13.

The central cylindrical member 4 is made of the stainless steel tube, one end thereof is stored inside the central hole 13, and a flange outwardly formed in the other end is welded to the inner surface of the diffuser shell 1. The central cylindrical member 4 also forms the ignition means accommodating chamber 10 for accommodating the ignition means inside the same, and has one row of through holes 14 in the other end side of the circumferential wall. The ignition means comprises the igniter 6 to be activated on a signal outputted from a sensor (not shown) and the transfer charge 7 to be ignited by the igniter 6, and the igniter 6 is disposed in the ignition means accommodating chamber 10 and is fixed by crimping one end of the central cylindrical member 4. The row of through holes 14 is closed by the aluminum tape 15.

There is used the coolant/filter 5 which is formed by winding the plain stitch wire mesh so as to form a multiple layers, and the coolant/filter 5 is disposed to surround the central cylindrical member 4. The coolant/filter 5 also defines an annular chamber, that is, a combustion chamber 9 in the periphery of the central cylindrical member 4, that is, between the periphery of the central cylindrical member 4 and the inner surface of the coolant/filter 5.

The gas generating agent 8 formed in a cylindrical shape with single hole is charged as the gas generating means in the combustion chamber 9, and is supported by an annular under plate 22. In the present embodiment, as the gas generating agent 8, an agent containing a fuel and an oxidant is used, and as the oxidant, the basic copper nitrate is used. When using the above gas generating agent 8, the copper mist in the molten state is generated due to the basic copper nitrate, however, since a melting point of the copper is high (1053° C.), the mist can be easily removed by cooling to about 1000° C., and therefore the discharge of the mist out of the gas generator can be restricted.

The coolant/filter 5 is positioned by an annular member 18 and the movement thereof is restricted. The annular member 18 is formed by press-molding the stainless steel plate, and includes the annular portion 16 partly covering the inner surface of the diffuser shell 1 and a wall portion 17 cylindrically bent from the annular portion 16 so as to contact with the inner surface of the end portion of the coolant/filter 5, to surround the outward flange of the central cylindrical member 4. It is desirable that the portion contacting with the end surface of the coolant/filter 5 in the annular portion 16 is formed to have a suitable elasticity. In other words, it is desirable to be formed in a shape capable of being elasticated at least in the axial direction of the coolant/filter 5, such as using the elastic member or having a substantially "S-shaped" cross section. This is performed for the purpose of eliminating a disadvantage at a time of arranging in the housing 3 caused by the fact that the coolant/filter 5 shown in this embodiment is structured such that one of the strands extending in two directions is formed to be along the axial direction of the coolant/filter 5 and no axial elasticity exists. Further, since the wall portion 17 is formed in the annular member 18 so as to support the inner surface of the end portion of the coolant/filter 5, it is possible to prevent a so-called short pass such that the operating gas generated by the combustion of the gas generating agent 8 passes over the end surface of the coolant/filter 5.

Further, in this embodiment, since the gas generating agent 8 employs the basic copper nitrate as the oxidant, the copper mist in the molten state is generated due to the combustion thereof. Then, in order to effectively remove the copper mist, the deflecting plate 19 formed by bending axially the outside of the annular portion into a cylindrical shape to partly cover the coolant/filter 5 is provided with the annular member 18 mentioned above. This deflecting plate 19 is formed so as to cover at least the part of the coolant/filter 5 projected horizontally from the gas discharge port 11 in the housing 3, and desirably arranged between the outer periphery of the coolant/filter 5 and the inner wall surface of the housing 3 to secure a predetermined gap 20 between both surfaces. With this structure, the copper mist generated due to the combustion of the gas generator 8 is cooled during passing through the coolant/filter 5, and the mist strikes against the deflecting plate 19 to be adhered thereto or drop, thereby being removed. The gap 20 formed between the outer periphery of the coolant/filter 5 and the inner wall surface of the housing 3 also functions as the flow-path of the operating gas.

In order to block entering of a moisture into the housing 3 from outside, the gas discharge port 11 of the diffuser shell 1 is closed by the aluminum tape 15.

In the gas generator structured in the above manner, when a sensor (not shown) detects the impact, the signal thereof is transmitted to the igniter 6 and the igniter 6 is activated, whereby the transfer charge 7 is ignited to generate a high-temperature flame. The flame breaks the wall of the aluminum tape 15 to be discharged from the row of through holes 14, and then enters into the combustion chamber 9 defined by the coolant/filter 5. The flame entering the combustion chamber 9 ignites the gas generating agent 8 near the through holes 14, and is deflected by the wall portion of the annular member 18 to ignite the gas generating agent 8 in the lower portion of the combustion chamber 9. Accordingly, the gas generating agent 8 is burnt so as to generate the gas having a high temperature and a high pressure. The combustion gas (that is, the operating gas) passes through the coolant/filter 5, and, at this time, the gas is cooled in accordance with a cooling function of the coolant/filter 5 and the combustion residue is collected in accordance with a collecting function of the filter, so that the cooled and purified combustion gas (that is, the operating gas) passes through the gas flow path (the gap 20) and flows into the air bag (not shown) through the gas discharge port 11. Consequently, the air bag is inflated to form a cushion between the passenger and a hard structure, thereby protecting the passenger from the impact.

Embodiment 7

(5) Housing in Which Inlet Port of Igniter Also has Bent Portion

FIG. 7 is a cross sectional view showing a gas generator for the air bag comprising a housing for the gas generator in one embodiment in accordance with the present invention.

The gas generator shown in this drawing comprising, in a housing 3 with a gas discharge port 11, a ignition means including an electric type igniter 6 and a transfer charge 7, and a gas generating means (that is, a gas generator 8) to generate an operating gas for inflating an air bag upon activation of the ignition means, in which a coolant/filter means (that is, a coolant 5) for cooling the operating gas generated due to the combustion of the gas generating agent 8 is disposed between a combustion chamber 9 which accommodates the gas generating agent 8 and a circumferential wall portion of the housing 3. Further, a deflecting member 18 having a tube portion 19 is arranged in the end portion of the coolant 5 in the diffuser shell 1 side.

The ignition means is stored in an ignition means accommodating chamber 10, and the ignition means accommodating chamber 10 is secured in a cylindrically formed inner cylindrical member 4 provided with a flange portion 24 welded to the inner surface of the upper end portion in the housing 3. The ignition means accommodating chamber 10 can communicate with the combustion chamber 9 provided outside the cylindrical member via a plurality of flame-transferring ports 14 formed on a circumferential wall of the inner cylindrical member 4. And, in the inner cylindrical member 4, an igniter 6 constituting the ignition means is stored in the lower end side thereof, and the end portion thereof is crimped to fix the igniter 6 in the inner cylindrical member 4. Further, the inner cylindrical member 4 in which the end portion is crimped to fix the igniter 6 is stored in an opening portion 60 of a closure shell 2 mentioned below so as not to protrude from the bottom surface of the housing 3 with the igniter 6 fixed. That is, in this embodiment, the inner cylindrical member 4 functions as an igniter supporting member.

In this embodiment, the housing 3 comprises a diffuser shell 1 formed in a substantially cylindrical shape with a top and having the gas discharge port, and the closure shell 2 formed in a substantially cylindrical shape with a bottom and closing the diffuser shell 1. Both shells can be formed by press-molding a stainless steel.

In the present embodiment, the diffuser shell 1 has a first circular portion 50 forming a ceiling surface (that is, the upper end portion) of the housing, an inclining portion 51 inclined downwards to surround the circular portion 50, a circumferential wall portion 52 descending perpendicularly to the circular portion from the inclining portion and provided with a plurality of gas discharge ports 11 along the peripheral direction, and a flange portion 53 extending radially from the circumferential wall portion. And on the other hand, the closure shell 2 has a second circular portion 54 which forms a bottom surface (that is, the lower end portion) of the housing and is provided with an ignition means receiving hole in the center, an opening portion 60 which is formed at the center of the second circular portion and provided with a tubular portion 61 which is bent towards the inside of the housing, a circumferential wall portion 55 which is bent from the peripheral edge of the second circular portion 54 and inclines as to spread outwardly and radially, and a flange portion 58 spreading outwardly and radially from a end of the circumferential wall portion. Both shells obtained in this manner forms the housing, which is an outer shell of the gas generator for an air bag, by joining to each other to be integrated.

In the housing formed in the this manner, the inner cylindrical member 4 is inserted to the opening portion 60 formed on the end surface in the closure shell side, and the inner cylindrical member 4 inserted to the opening portion 60 is welded and fixed near the inlet port of the opening portion. In the opening portion, a connecting portion 62 fixing the inner cylindrical member 4 with a welding is provided inside of the housing rather than on the bottom surface of the housing, that is, the bottom surface of the closure shell. In particular, in this embodiment, the periphery of the opening portion 60 is formed so as to be inclined inside the housing towards the center thereof, thereby setting the connecting portion 62 of the opening portion inside the housing rather than the bottom surface of the housing. Further, the opening portion 60 is formed so as to correspond to an outer diameter and a shape of the inner cylindrical member for the purpose of inserting and fixing the inner cylindrical member.

Then, since the opening portion 60 is provided with the tubular portion 61 bent inside the housing 3, the inner cylindrical member 4 can be fixed more securely. And, since the tubular portion 61 is bent inside the housing 3, there is never be the case such that only the tubular portion 61 is protruded outside in the axial direction of the housing 3, and therefore, the overall height of the housing 3 itself can be restricted, and thereby, the overall height of the gas generator can be restricted. On the contrary, when the above gas generator is formed to have the same height as that of the gas generator in which the tubular portion 61 is bent outside the housing 3, the internal capacity of the housing can be sufficiently increased even it has the same height and outer diameter.

Further, since the tubular portion 61 is bent inside the housing 3, even in the case of outwardly fitting a substantially annular under plate 22, which supports the gas generating means, to the inner cylindrical member 4 and being disposed in the combustion chamber 9 as shown in the present embodiment, the under plate 22 is supported by the tubular portion 61 because the portion inwardly fitting the inner cylindrical member 4 contacts with the end of the tubular portion 61.

The gas generator shown in the present embodiment corresponds to a gas generator which is preferably arranged in the driver side in particular, and is formed so that an overall height (that is, the axial length) is about 35 mm. In the gas generator structured in the above manner, the tubular portion 61 provided in the opening portion 60 is formed along about 17% of the axial length of the housing so that the axial length is about 6 mm.

In this housing 3, the circumferential wall portion 55 of the closure shell 2 is inclined towards the circumferential wall portion 52 spreading more outwardly and radially than the first circular portion 50 because of the inclining portion 51 of the diffuser shell 1, and a bent portion 56 formed between the second circular portion 54 and the circumferential wall portion 55 in the closure shell 2 is adjusted so that the interior angle θ becomes between 90 and 135 degrees.

Further, in the present embodiment, the first and second circular portions 50 and 54 are formed so as to have the same size. Accordingly, the coolant 5 disposed in the housing is structured such that the outer periphery of the upper end surface thereof is supported via the deflecting member 18 by a bent portion 57 formed between the first circular portion 50 and the inclining portion 51 in the diffuser shell 1, and the outer periphery of the lower end surface of the coolant 5 is directly supported by a bent portion 56 formed between the second circular portion 54 and the circumferential wall portion 55 in the closure shell 2. By supporting the outer peripheries of the upper and lower end surfaces of the coolant 5 by the bent portions 56 and 57 formed in the housing in this manner, the coolant is positioned and supported by the bent portions at a time of arranging the coolant 5. Further, at a time of activation of the gas generator, the coolant 5 is press-contacted with and supported by the bent portion to block a movement thereof, the upper end portion of the coolant 5 is surrounded by the deflecting member 18 so as to be adhered to the bent portion 57 of the diffuser shell 1, and the outer peripheral edge of the lower end portion of the coolant 5 is directly adhered to the bent portion 56 of the closure shell 2 so as to prevent the operating gas from passing between the inner surface of the housing and the coolant 5 (that is, the short pass).

In this case, at a time of forming the housing, it is possible to form a rib-like reinforcing member and/or a reinforcing step portion in both or either of the first circular portion 50 of the diffuser shell and the second circular portion 54 of the closure shell so as to improve the strength of the housing.

The coolant 5 disposed in the housing is preferably structured such as not to expand outwardly and radially by a pressure caused when the operating gas passes through. This is because, in the case that the coolant 5 is expanded out due to passage of the gas generating means, a gap 20 secured between the coolant 5 and the inner periphery of the housing is closed and can not function as the gas flow-path. Accordingly, the coolant 5 shown in this embodiment is formed so that a tensile strength in the radial direction is 12054 N (1230 kgf).

The deflecting member 18 is useful in the case of using the gas generating agent 8 to generate the combustion product in a fluidized state or a semi-fluidized state due to the combustion. That is, the combustion product generated due to the combustion of the gas generating agent cab be removed by adhering the combustion product to the tube portion 19 of the deflecting member 18 or by allowing the product to strike thereagainst to drop. Further, since the annular portion 16 contacting with the end surface of the coolant 5 in the deflecting member 18 is formed to have a suitable elasticity, a wire mesh coolant 5 less elasticated in the axial direction can be used as the coolant 5 disposed outside in the radial direction of the combustion chamber 9. Further, in the deflecting member 18, the wall portion 17 contacting with the inner periphery of the coolant 5 is integrally formed with the annular portion 16. With this structure, it is possible to position and fix the coolant 5 and a so-called short pass that the operating gas is discharged without passing through the coolant can be inhibited.

In the gas generator formed in the above manner, the transfer charge 7 is ignited and burnt by the igniter 6 activated upon the activating signal, and the flame thereof is discharged into an accommodating space of the gas generating agent 8 through a flame-transferring port 14 of the inner cylindrical member 4. The flame of the transfer charge 7 ignites and burns the gas generating agent 8, and even in the case that a part thereof directly passes through the coolant 5, it strikes against the tube portion 19 of the deflection member 18, and thereby the flame is prevented from directly being discharged through the gas discharge port 11. The operating gas which is generated by the gas generating agent 8 ignited by the flame of the transfer charge 7 passes through the coolant 5 and reaches inside the gap 20 secured between the outer periphery of the coolant 5 and the inner periphery of the housing 3. In the case that the combustion product in a fluidized state or a semi-fluidized state is contained in the operating gas after passing through the coolant 5, the combustion product strikes against or is adhered to the tube portion 19 of the deflecting member 18 arranged in the gap 20 so as to be removed from the operating gas.

In FIG. 7, the gas discharge port 11 and the flame-transferring port 14 are respectively closed by seal tapes 15, and the gas generating agent 8 is supported by the under plate 22 and is stored in the combustion chamber. Further, the member described as the deflecting member 18 in the present embodiment can function as a mist collecting member or a flame preventing plate in the same structure.

Embodiment 8

Air Bag Apparatus

The gas generator for the air bag mentioned above is stored within a module case together with an air bag (bag body) to introduce a gas generated in the gas generator and inflate, thereby forming an air bag apparatus.

The air bag apparatus discharges the combustion gas from a gas discharge port of the housing when the gas generator is activated, reacting upon an impact sensor detecting the impact. The combustion gas flows into the air bag, whereby the air bag breaks the module cover so as to inflate, thereby forming a cushion absorbing the impact between a hard structure in the vehicle and a passenger.

Figure 8:
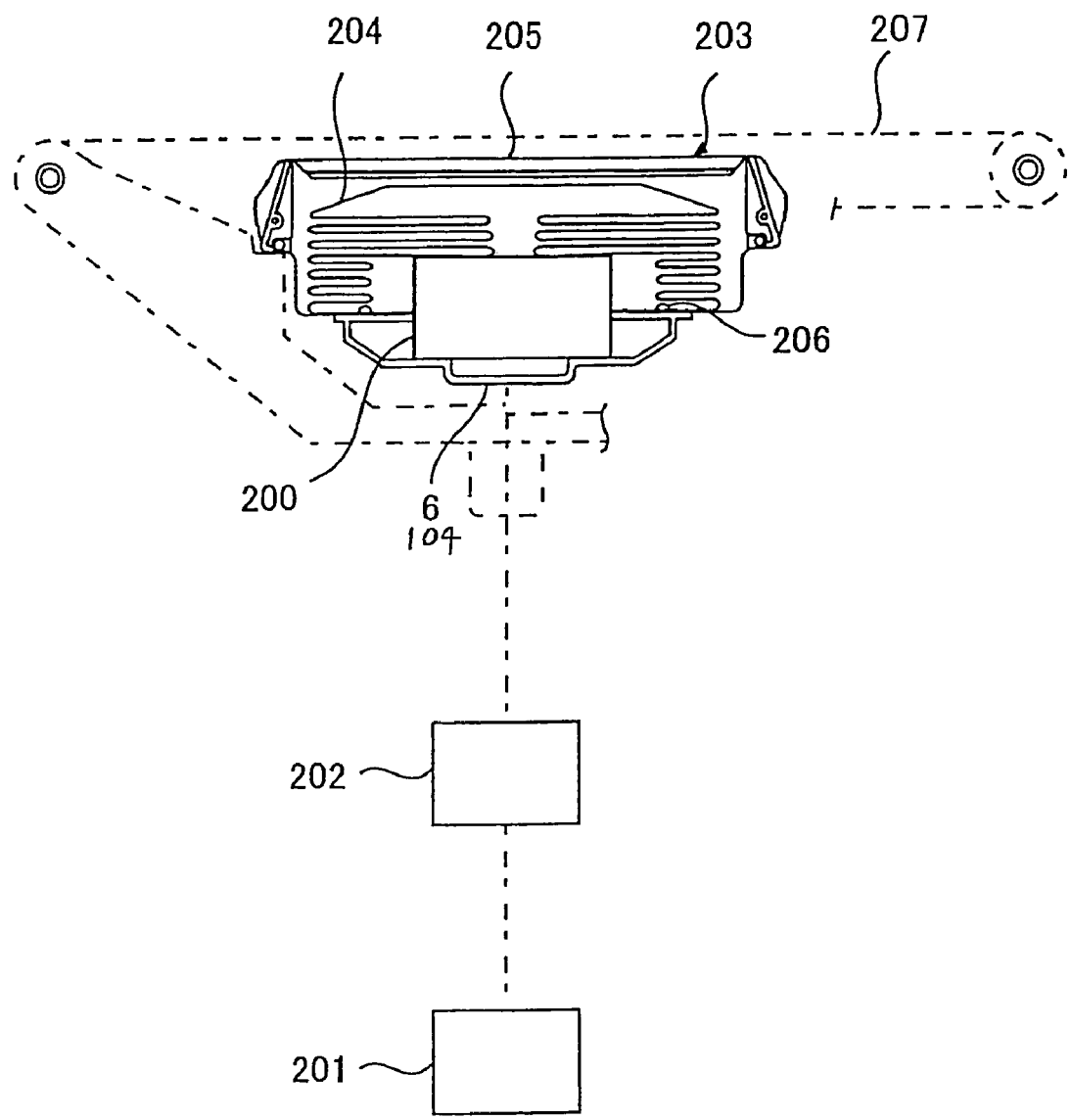
FIG. 8 is a schematic view of an air bag apparatus including any one of the aspects (1) to (5) of the present invention.

FIG. 8 shows an embodiment of the air bag apparatus including a gas generator using an electric ignition type ignition means.

The air bag apparatus comprises a gas generator 200, an impact sensor 201, a control unit 202, a module case 203 and an air bag 204. The gas generator 200 employs the gas generator described on the basis of any one of FIGS. 1, 4, 5 and 7, and the activation performance thereof is adjusted so as not to apply as small impact to a passenger as possible at the initial stage of the activation of the gas generator.

The impact sensor 201 may comprise, for example, a semiconductor type acceleration sensor. The semiconductor type acceleration sensor is structured such that four semiconductor strain gauges are formed on a beam of a silicon plate to defect when an acceleration is applied, and these semiconductor strain gauges are bridge connected. When the acceleration is applied, the beam defects and the strain is produced on the surface. Due to this strain, a resistance of the semiconductor strain gauge is changed, and the resistance change is detected as a voltage signal in proportion to the accelerator.

The control unit 202 is provided with an ignition judging circuit, and is structured such that the signal from the semiconductor type acceleration sensor is inputted to the ignition judging circuit. The control unit 202 starts calculating at a time when the impact signal outputted from the sensor 201, and outputs the activating signal to the igniter 5 or 104 of the gas generator 200 when the calculated result exceeds a certain value.

The module case 203 is formed, for example, by a polyurethane, and includes a module cover 205. The air bag 204 and the gas generator 200 are stored in the module case 203 so as to constitute a pad module. The pad module is generally mounted to a steering wheel 207 in the case of being mounted to the driver side of automobiles.

The airbag 204 is formed by a nylon (for example, a nylon 66), a polyester or the like, a bag port 206 thereof surrounds the gas discharge port of the gas generator, and the air bag is fixed to the annular portion of the gas generator in a folded state.

When the semiconductor type acceleration sensor 201 detects the impact at a time when the motor vehicle is collided, the signal is transmitted to the control unit 202, and the control unit 202 starts calculating when the impact signal outputted from the sensor exceeds a certain value. When the calculated result exceeds a certain value, the control unit 202 outputs the activating signal to the igniter 6 of the gas generator 200. Accordingly, the igniter 6 or 104 is activated to ignite the gas generating agent, and the gas generating agent burns and generates a gas. The gas is injected out into the air bag 204, and thereby the air bag breaks the module cover 205 so as to inflate and forms a cushion absorbing the impact between the steering wheel 207 and a passenger.

The invention claimed is:

1. A gas generator for an air bag comprising:
 a cylindrical housing formed by
  a diffuser shell that is provided with a gas discharge port and including a top wall, a first circumferential wall, and a first bent portion connecting the top wall and the first circumferential wall, and
  a closure shell including a bottom wall, a second circumferential wall, and a second bent portion connecting the bottom wall and the second circumferential wall,
  at least one of the first circumferential wall and the second circumferential wall being inclined from the first bent portion and the second bent portion, respectively, to spread radially and outwardly with respect to a longitudinal axis of the cylindrical housing;
 a gas generating means, provided within the cylindrical housing, to generate an operating gas for inflating an air bag; and
 a cylindrical coolant means to carry out at least one of cooling and purifying the operating gas and being provided within the housing such that at least one of an upper outer periphery and a lower outer periphery thereof is in attachment to the first bent portion and the second bent portion, respectively; and
 a gap forming a flow-path of the operating gas secured between an outer circumferential surface of the cylindrical coolant means and inner surfaces of the first circumferential wall and the second circumferential wall.

2. A gas generator for an air bag as claimed in claim 1, wherein at least one of the upper outer periphery and the lower outer periphery is in attachment to the first bent portion and the second bent portion, respectively, at a time of at least one of assembling the gas generator and activating the gas generator.

3. A gas generator for an air bag as claimed in claim 1, wherein an inner surface of the second circumferential wall spreads from the second bent portion radially in an outward direction with respect to a longitudinal axis of the cylindrical housing.

4. A gas generator for an air bag as claimed in claim 1, wherein an inner surface of the second circumferential wall is formed in an inverted conical trapezoidal shape.

5. A gas generator for an air bag as claimed in claim 1, wherein, in the cylindrical housing, an interior angle between an inner surface of the first circumferential. wall and an inner surface of the top wall and/or an inner surface of the second circumferential wall and an inner surface of the bottom wall are 90 to 150 degrees.

6. A gas generator for an air bag as claimed in claim 1, wherein the cylindrical coolant means is formed to have a strength capable of preventing the coolant means from being expanded radially and outwardly at a time of cooling and/or purifying the operating gas.

7. A gas generator for an air bag as claimed in claim 1, wherein the cylindrical coolant means is formed to have at least a tensile strength in the radial direction between 2450 and 19600 N.

8. A gas generator for an air bag as claimed in claim 1, wherein the cylindrical coolant means is formed to expand radially and outwardly at a time of cooling and/or purifying the operating gas, and the upper outer periphery and the lower outer periphery of the cylindrical coolant means are in attachment to the first bent portion and the second bent portion, respectively.

9. A housing of a gas generator for an air bag, which is a cylindrical housing used in a gas generator for an air bag generating an operating gas for inflating the air bag upon impact, comprising:

a diffuser shell including a gas discharge port and an igniter supporting member connected to the diffuser shell;

a closure shell including an opening for accommodating therein the igniter supporting member, the closure shell further having a bottom wail, a cylindrical wall extending into an inner space of the housing and being in contact with an outer surface of the igniter supporting member, and an inclined surface connecting the bottom wall at a bent portion, the inclined surface being formed to be inclined from the bent portion to spread outwardly and radially with respect to a longitudinal axis of the cylindrical housing.

10. An air bag apparatus comprising:

a gas generator for an air bag;

an impact sensor for detecting an impact to activate the gas generator;

an air bag to introduce a gas generated in the gas generator for inflating; and a module case accommodating the air bag, wherein the gas generator for the air bag is the gas generator for the air bag as claimed in claim 1.

11. A gas generator for an air bag as claimed in claim 1, further comprising:

a deflector member including a tubular portion and an annular portion formed integrally and being provided within the cylindrical housing such that the tubular portion opposes the gas discharge port and the annular portion is between the top wall and a top end of the cylindrical coolant means.

12. A gas generator of an air bag as claimed in claim 11, wherein the deflector member is provided such that a connecting portion of the tubular portion and the annular portion is in attachment to the first bent portion.

* * * * *